US011133912B2

(12) United States Patent
Lee et al.

(10) Patent No.: US 11,133,912 B2
(45) Date of Patent: Sep. 28, 2021

(54) BANDWIDTH PART ACTIVATION, DEACTIVATION, AND SWITCHING IN WIRELESS COMMUNICATIONS

(71) Applicant: QUALCOMM Incorporated, San Diego, CA (US)

(72) Inventors: Heechoon Lee, San Diego, CA (US); Peter Gaal, San Diego, CA (US); Peter Pui Lok Ang, San Diego, CA (US); Wanshi Chen, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 84 days.

(21) Appl. No.: 16/147,339

(22) Filed: Sep. 28, 2018

(65) Prior Publication Data

US 2019/0103954 A1    Apr. 4, 2019

Related U.S. Application Data

(60) Provisional application No. 62/567,199, filed on Oct. 2, 2017.

(51) Int. Cl.
*H04L 5/00* (2006.01)
*H04W 72/04* (2009.01)
(Continued)

(52) U.S. Cl.
CPC ............ *H04L 5/0098* (2013.01); *H04L 5/001* (2013.01); *H04L 5/0053* (2013.01); *H04W 24/10* (2013.01);
(Continued)

(58) Field of Classification Search
CPC ..... H04L 5/0098; H04L 5/001; H04L 5/0053; H04L 5/0057; H04L 5/0055; H04W 48/12;
(Continued)

(56) References Cited

U.S. PATENT DOCUMENTS 10,687,248 B2 *   6/2020   Babaei .................. H04L 1/1854
2011/0105107 A1 *  5/2011   Kwon ................... H04W 48/08
                                                                455/422.1
(Continued)

OTHER PUBLICATIONS

Huawei, et al., "Bandwidth Part Activation and Adaptation," 3GPP Draft; R1-1715571, 3rd Generation Partnership Project (3GPP), Mobile Competence Centre; 650, Route Des Lucioles; F-06921 Sophia-Antipolis Cedex; France, vol. Ran WG1, no. Nagoya, Japan; Sep. 18, 2017-Sep. 21, 2017, Sep. 17, 2017, XP051339038, 5 pages, Retrieved from the Internet: URL: http://www.3gpp.org/ftp/Meetings_3GPP_SYNC/RAN1/Docs/ [retrieved on Sep. 17, 2017].
(Continued)

*Primary Examiner* — Will W Lin
(74) *Attorney, Agent, or Firm* — Holland & Hart LLP; Nerrie M. Zohn

(57) ABSTRACT

Methods, systems, and devices for wireless communications are described that provide for transmission of an indication of an activated bandwidth part (BWP) or component carrier (CC), or combination thereof, to a user equipment (UE) through downlink control information (DCI) that is excluding a grant of resources of the BWP or CC. A UE may establish a connection with a base station in which one or more CCs may be configured with one or more BWPs. The base station may indicate which BWP is active for a transmission in DCI that is transmitted subsequent to the configuration of the one or more CCs, and a UE may activate a corresponding BWP or CC based on the indication. In some cases, a CC may be deactivated unless the DCI indicates that at least one BWP of the CC is active.

28 Claims, 19 Drawing Sheets

(51) Int. Cl.
  *H04W 76/28* (2018.01)
  *H04W 52/14* (2009.01)
  *H04W 24/10* (2009.01)
  *H04W 48/12* (2009.01)

(52) U.S. Cl.
  CPC ......... *H04W 48/12* (2013.01); *H04W 52/146* (2013.01); *H04W 72/042* (2013.01); *H04W 72/0453* (2013.01); *H04W 76/28* (2018.02); *H04L 5/0055* (2013.01); *H04L 5/0057* (2013.01)

(58) Field of Classification Search
  CPC ............... H04W 72/042; H04W 24/10; H04W 52/146; H04W 76/28; H04W 72/0453
  See application file for complete search history.

(56) References Cited

U.S. PATENT DOCUMENTS

| | | | | |
|---|---|---|---|---|
| 2011/0243008 A1* | 10/2011 | Kim | ...................... | H04L 5/0007 370/252 |
| 2011/0269492 A1* | 11/2011 | Wang | ...................... | H04L 47/14 455/509 |
| 2013/0051355 A1* | 2/2013 | Hong | ...................... | H04L 5/0094 370/329 |
| 2013/0058294 A1* | 3/2013 | Miki | ...................... | H04L 5/001 370/329 |
| 2013/0195065 A1* | 8/2013 | Park | ...................... | H04L 5/0055 370/329 |
| 2016/0100382 A1* | 4/2016 | He | ...................... | H04W 72/042 370/329 |
| 2017/0359746 A1* | 12/2017 | Lee | ...................... | H04L 5/0044 |
| 2018/0027568 A1* | 1/2018 | Harada | ...................... | H04W 24/10 370/230 |
| 2018/0279358 A1* | 9/2018 | Babaei | ...................... | H04W 72/0453 |
| 2019/0036673 A1* | 1/2019 | Chen | ...................... | H04L 5/001 |
| 2019/0104539 A1* | 4/2019 | Park | ...................... | H04W 72/042 |
| 2019/0104543 A1* | 4/2019 | Park | ...................... | H04W 72/0453 |
| 2019/0297611 A1* | 9/2019 | Rico Alvarino | ...................... | H04L 5/0053 |
| 2019/0364556 A1* | 11/2019 | Davydov | ...................... | H04B 7/088 |
| 2020/0196263 A1* | 6/2020 | Heyn | ...................... | H04W 56/0005 |
| 2020/0252180 A1* | 8/2020 | Takeda | ...................... | H04W 72/04 |
| 2020/0259621 A1* | 8/2020 | Oh | ...................... | H04L 1/1822 |

OTHER PUBLICATIONS

International Search Report and Written Opinion—PCT/US2018/052159—ISA/EPO—Jan. 16, 2019 (180094WO).

Qualcomm Incorporated: "CA and BWP," 3GPP Draft; R1-1716440_CA_BWP, 3rd Generation Partnership Project (3GPP), Mobile Competence Centre; 650, Route Des Lucioles; F-06921 Sophia-Antipolis Cedex; France, vol. RAN WG1, no. Nagoya, Japan; Sep. 18, 2017-Sep. 21, 2017, Sep. 17, 2017, XP051339895, 7 pages, Retrieved from the Internet: URL: http://www.3gpp.org/ftp/Meetings_3GPP_SYNC/RAN1/Docs/ [retrieved on Sep. 17, 2017].

Samsung: "Activation/deactivation of Bandwidth Parts in NR," 3GPP Draft; R2-1711189, Activation_Deactivation of Bandwidth Part in NR_R2, 3rd Generation Partnership Project (3GPP), Mobile Competence Centre; 650, Route Des Lucioles; F-06921, Sophia-Antipolis Cede, vol. Ran WG2, no. Prague, Czech; Oct. 9, 2017-Oct. 13, 2017, Sep. 29, 2017, XP051355440, 5 pages, Retrieved from the Internet: URL: http://www.3gpp.org/ftp/tsg_ran/WG2_RL2/TSGR2_99bis/Docs/ [retrieved on Sep. 29, 2017].

* cited by examiner

BANDWIDTH PART ACTIVATION, DEACTIVATION, AND SWITCHING IN WIRELESS COMMUNICATIONS

CROSS REFERENCE

The present application for patent claims the benefit of U.S. Provisional Patent Application No. 62/567,199 by LEE, et al., entitled "BANDWIDTH PART ACTIVATION, DEACTIVATION, AND SWITCHING IN WIRELESS COMMUNICATIONS," filed Oct. 2, 2017, assigned to the assignee hereof, and expressly incorporated herein by its entirety.

BACKGROUND

The following relates generally to wireless communication, and more specifically to bandwidth part activation, deactivation, and switching in wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some systems, connections may be established using a relatively wide channel frequency bandwidth. In some cases, one or more portions of the channel frequency bandwidth, referred to as bandwidth parts (BWPs), may be used for communications with a UE. In such cases, if a relatively small amount of data is to be transferred between the UE and a base station, a single BWP may be used for a transmission, and if a relatively large amount of data is to be transferred, two or more BWPs may be used for the transmission. Bandwidth parts may be configured with different bandwidth. Narrow bandwidth may be configured for BWP to be used if the amount of data to be transferred is small; and wider bandwidth may be configured for one or more BWPs if the amount of data to be transferred is relatively large. As such, the UE may be able to switch BWPs based on the amount of data to be transferred (e.g., switching to a wide BW when there is a burst of data traffic, or to a narrow BW when the burst tapers down), and thus, reduce power consumption during the communication with the base station.

In some cases, such connections may be made according to a carrier aggregation (CA) mode, in which multiple component carriers (CCs), each of which can have one or more BWPs, can be used together to provide high data rate communications. When operating in a CA mode that provides multiple BWPs in one or more CCs, UEs may measure one or more channel characteristics of the different BWPs or CCs for use in setting one or more transmission parameters that use the BWPs or CCs. Such measurements may consume power at the UE and transmission of measurement reports use wireless resources, and it may be beneficial to perform such measurements and report transmissions when a particular BWP, CC, or combination thereof, is to be used for transmissions with a UE. Thus, efficient techniques for signaling activation of BWPs, CCs, or any combination thereof, may be desirable.

SUMMARY

The described techniques relate to improved methods, systems, devices, or apparatuses that support bandwidth part (BWP) activation, deactivation, and switching in wireless communications. BWP switching enables a UE to switch from a narrow bandwidth to a wide bandwidth in accordance with scheduled data traffic, thereby saving power and reducing latency at the UE. However, the base station may transmit control information to the UE to activate, deactivate or switch BWPs that may result in the UE consuming unnecessary power (e.g., by requiring the UE to continuously monitor and report channel conditions of all available BWPs) or increase latency (e.g., related to decoding PDSCH corresponding to the signal). Activating, deactivating, or switching BWPs based on a downlink control information (DCI) without a grant (e.g., a scheduling DCI without a corresponding PDSCH to decode) may enable a UE to achieve power savings and reduce latency.

Generally, the described techniques provide for transmission of an indication to activate, deactivate, or switch a bandwidth part (BWP) or component carrier (CC), or combination thereof, to a user equipment (UE) through downlink control information (DCI) that excludes a grant of resources of the BWP or CC. In some cases, a UE may establish a connection with a base station in which one or more CCs may be configured with one or more BWPs. The base station may indicate which BWP is active for a transmission in DCI that is transmitted subsequent to the configuration of the one or more CCs, and a UE may activate a corresponding BWP or CC based on the indication. In some cases, a CC may be deactivated unless the DCI indicates that at least one BWP of the CC is active.

In some cases, a UE may perform measurements and transmit a measurement report for an activated BWP responsive to the indication of activation from the DCI. The activated BWP may remain active until a BWP timer expires, or until a subsequent DCI indicates that an activated BWP is to be inactivated. In some cases, a table of combinations of activated BWPs and deactivated BWPs may be configured, and the DCI may include an index into the table to indicate which BWPs are active and which BWPs are inactive. In some cases, the DCI may include a bitmap that indicates which BWPs are active and which BWPs are inactive. In some cases, a UE may transmit an acknowledgment of receipt of the DCI to the base station using resources indicated in the DCI or in preconfigured acknowledgment resources. In some cases, one or more DCI transmissions may be received during a discontinuous reception (DRX) ON duration, or while a DRX inactivity timer is running which started during the DRX ON duration, or any combination thereof.

A method of wireless communication is described. The method may include establishing, at a UE, a connection with a base station using a primary CC, the primary CC having a plurality of BWPs each having a portion of a frequency bandwidth of the primary CC, receiving first DCI, the first DCI including an indication to activate a selected BWP of the plurality of BWPs, the first DCI excluding a grant of resources of the selected BWP for the UE, and activating the selected BWP based at least in part on the first DCI.

An apparatus for wireless communication is described. The apparatus may include means for establishing, at a UE, a connection with a base station using a primary CC, the primary CC having a plurality of BWPs each having a portion of a frequency bandwidth of the primary CC, means for receiving first DCI, the first DCI including an indication to activate a selected BWP of the plurality of BWPs, the first DCI excluding a grant of resources of the selected BWP for the UE, and means for activating the selected BWP based at least in part on the first DCI.

Another apparatus for wireless communication is described. The apparatus may include a processor, memory in electronic communication with the processor, and instructions stored in the memory. The instructions may be operable to cause the processor to establish, at a UE, a connection with a base station using a primary CC, the primary CC having a plurality of BWPs each having a portion of a frequency bandwidth of the primary CC, receive first DCI, the first DCI including an indication to activate a selected BWP of the plurality of BWPs, the first DCI excluding a grant of resources of the selected BWP for the UE, and activate the selected BWP based at least in part on the first DCI.

A non-transitory computer-readable medium for wireless communication is described. The non-transitory computer-readable medium may include instructions operable to cause a processor to establish, at a UE, a connection with a base station using a primary CC, the primary CC having a plurality of BWPs each having a portion of a frequency bandwidth of the primary CC, receive first DCI, the first DCI including an indication to activate a selected BWP of the plurality of BWPs, the first DCI excluding a grant of resources of the selected BWP for the UE, and activate the selected BWP based at least in part on the first DCI.

Some examples of the method, apparatus, and non-transitory computer-readable medium described above may further include processes, features, means, or instructions for deactivating the selected BWP based at least in part on an indication received in a second DCI or an expiration of a predetermined timer associated with the selected BWP. Some examples of the method, apparatus, and non-transitory computer-readable medium described above may further include processes, features, means, or instructions for receiving a second DCI including an indication to switch from the selected BWP to a second selected BWP of the plurality of BWPs, the second DCI excluding a grant of resources of the second selected BWP for the UE.

In some examples of the method, apparatus, and non-transitory computer-readable medium described above, the first DCI may further include an indication to activate a secondary CC. Some examples of the method, apparatus, and non-transitory computer-readable medium described above may further include processes, features, means, or instructions for receiving a medium access control (MAC) control element (CE) indicating to activate a secondary CC, and activating the secondary CC based at least in part on the MAC CE. Some examples of the method, apparatus, and non-transitory computer-readable medium described above may further include processes, features, means, or instructions for activating one or more BWPs of a secondary CC based at least in part on the first DCI including an indication to activate the secondary CC. Some examples of the method, apparatus, and non-transitory computer-readable medium described above may further include processes, features, means, or instructions for deactivating the secondary CC via a zero BWP. Some examples of the method, apparatus, and non-transitory computer-readable medium described above may further include processes, features, means, or instructions for transmitting an acknowledgement to the base station that indicates the second DCI was successfully received. Some examples of the method, apparatus, and non-transitory computer-readable medium described above may further include processes, features, means, or instructions for transmitting, within an uplink control channel, a transmission in accordance with power control for the selected BWP, where the selected BWP is an uplink BWP.

In some examples of the method, apparatus, and non-transitory computer-readable medium described above, the activating the selected BWP includes measuring one or more channel characteristics associated with the selected BWP. Some examples of the method, apparatus, and non-transitory computer-readable medium described above may further include processes, features, means, or instructions for transmitting an indication of the one or more measured channel characteristics to the base station. Some examples of the method, apparatus, and non-transitory computer-readable medium described above may further include processes, features, means, or instructions for receiving, subsequent to the transmitting the indication of the one or more measured channel characteristics, a second DCI including a grant of resources of the selected BWP.

Some examples of the method, apparatus, and non-transitory computer-readable medium described above may further include processes, features, means, or instructions for deactivating the selected BWP based at least in part on an indication received in a second DCI or an expiration of a predetermined timer associated with the selected BWP.

Some examples of the method, apparatus, and non-transitory computer-readable medium described above may further include processes, features, means, or instructions for transmitting an acknowledgment to the base station that indicates the first DCI was successfully received. In some examples of the method, apparatus, and non-transitory computer-readable medium described above, the transmitting the acknowledgment to the base station may include identifying uplink resources for transmitting the acknowledgment. Some examples of the method, apparatus, and non-transitory computer-readable medium described above may further include processes, features, means, or instructions for transmitting the acknowledgment using the identified uplink resources. In some examples of the method, apparatus, and non-transitory computer-readable medium described above, the identified uplink resources may be indicated in the first DCI, selected from one or more preconfigured uplink resources, or any combination thereof.

In some examples of the method, apparatus, and non-transitory computer-readable medium described above, the first DCI further includes an indication to activate a secondary CC. In some examples of the method, apparatus, and non-transitory computer-readable medium described above, the indication to activate the secondary CC may include an indication to activate one or more BWPs of the secondary CC. Some examples of the method, apparatus, and non-transitory computer-readable medium described above may further include processes, features, means, or instructions for receiving a second DCI including a grant of resources of the secondary CC, and deactivating the secondary CC based on either an indication received in a third DCI or an expiration of predetermined timer associated with the activated BWP associated with the secondary CC. In some examples of the method, apparatus, and non-transitory computer-readable medium described above, activation and deactivation of the secondary CC occur during a DRX ON duration, or while a DRX inactivity timer is running which started during the DRX ON duration, or any combination thereof. Some examples of the method, apparatus, and non-transitory computer-readable medium described above may further include processes, features, means, or instructions for receiving a third DCI that includes an indication to deactivate the secondary CC. In some examples of the method, apparatus, and non-transitory computer-readable medium described above, the first DCI, the second DCI, and the third DCI may be each received during a DRX ON duration, or while a DRX inactivity timer may be running which started during the DRX ON duration, or any combination thereof.

In some examples of the method, apparatus, and non-transitory computer-readable medium described above, the indication to activate the selected BWP of the plurality of BWPs may include an index value mapped to a table of combinations of active and inactive BWPs, or a bitmap indicating which of the plurality of BWPs may be active and inactive.

A method of wireless communication is described. The method may include establishing, at a base station, a connection with a UE using a primary CC, the primary CC having a plurality of BWPs each having a portion of a frequency bandwidth of the primary CC, formatting first DCI to include an indication to the UE to activate a selected BWP of the plurality of BWPs, the first DCI excluding a grant of resources of the selected BWP for the UE, and transmitting the first DCI to the UE.

An apparatus for wireless communication is described. The apparatus may include means for establishing, at a base station, a connection with a UE using a primary CC, the primary CC having a plurality of BWPs each having a portion of a frequency bandwidth of the primary CC, means for formatting first DCI to include an indication to the UE to activate a selected BWP of the plurality of BWPs, the first DCI excluding a grant of resources of the selected BWP for the UE, and means for transmitting the first DCI to the UE.

Another apparatus for wireless communication is described. The apparatus may include a processor, memory in electronic communication with the processor, and instructions stored in the memory. The instructions may be operable to cause the processor to establish, at a base station, a connection with a UE using a primary CC, the primary CC having a plurality of BWPs each having a portion of a frequency bandwidth of the primary CC, format first DCI to include an indication to the UE to activate a selected BWP of the plurality of BWPs, the first DCI excluding a grant of resources of the selected BWP for the UE, and transmit the first DCI to the UE.

A non-transitory computer-readable medium for wireless communication is described. The non-transitory computer-readable medium may include instructions operable to cause a processor to establish, at a base station, a connection with a UE using a primary CC, the primary CC having a plurality of BWPs each having a portion of a frequency bandwidth of the primary CC, format first DCI to include an indication to the UE to activate a selected BWP of the plurality of BWPs, the first DCI excluding a grant of resources of the selected BWP for the UE, and transmit the first DCI to the UE.

Some examples of the method, apparatus, and non-transitory computer-readable medium described above may further include processes, features, means, or instructions for transmitting, subsequent to the transmitting the first DCI, a second DCI that includes an indication to the UE to deactivate the selected BWP. Some examples of the method, apparatus, and non-transitory computer-readable medium described above may further include processes, features, means, or instructions for transmitting a second DCI including an indication to the UE to switch from the selected BWP to a second selected BWP of the plurality of BWPs, the second DCI excluding a grant of resources of the second selected BWP for the UE. In some examples of the method, apparatus, and non-transitory computer-readable medium described above, the first DCI further includes an indication to activate a secondary CC.

Some examples of the method, apparatus, and non-transitory computer-readable medium described above may further include processes, features, means, or instructions for receiving, from the UE, one or more channel characteristic measurements associated with the selected BWP. Some examples of the method, apparatus, and non-transitory computer-readable medium described above may further include processes, features, means, or instructions for determining one or more transmission parameters for transmissions using the selected BWP based at least in part on the one or more channel characteristic measurements associated with the selected BWP. Some examples of the method, apparatus, and non-transitory computer-readable medium described above may further include processes, features, means, or instructions for transmitting, subsequent to the determining the one or more transmission parameters, a second DCI to the UE that includes a grant of resources for the selected BWP.

Some examples of the method, apparatus, and non-transitory computer-readable medium described above may further include processes, features, means, or instructions for transmitting, subsequent to the transmitting the first DCI, a second DCI that deactivates the selected BWP.

Some examples of the method, apparatus, and non-transitory computer-readable medium described above may further include processes, features, means, or instructions for configuring uplink resources for transmission of an acknowledgment by the UE that indicates the first DCI was successfully received. Some examples of the method, apparatus, and non-transitory computer-readable medium described above may further include processes, features, means, or instructions for receiving the acknowledgment from the UE via the configured uplink resources. In some examples of the method, apparatus, and non-transitory computer-readable medium described above, the identified uplink resources may be indicated in the first DCI, selected from one or more preconfigured uplink resources, or any combination thereof.

In some examples of the method, apparatus, and non-transitory computer-readable medium described above, the first DCI further includes an indication to activate a secondary CC. In some examples of the method, apparatus, and non-transitory computer-readable medium described above, the indication to activate the secondary CC may include an indication to activate one or more BWPs of the secondary CC. Some examples of the method, apparatus, and non-transitory computer-readable medium described above may further include processes, features, means, or instructions for determining a resource grant for the secondary CC. Some examples of the method, apparatus, and non-transitory computer-readable medium described above may further include processes, features, means, or instructions for transmitting a second DCI including the resource grant for the secondary CC. Some examples of the method, apparatus, and non-transitory computer-readable medium described above may further include processes, features, means, or instructions for determining that the secondary CC may be to be deactivated. Some examples of the method, apparatus, and non-transitory computer-readable medium described above may further include processes, features, means, or instructions for transmitting a third DCI that includes an indication to deactivate the secondary CC.

In some examples of the method, apparatus, and non-transitory computer-readable medium described above, the indication to activate the selected BWP of the plurality of BWPs may include an index value mapped to a combination of active and inactive BWPs, or a bitmap indicating which of the plurality of BWPs may be active and inactive.

DETAILED DESCRIPTION

Figure 1:
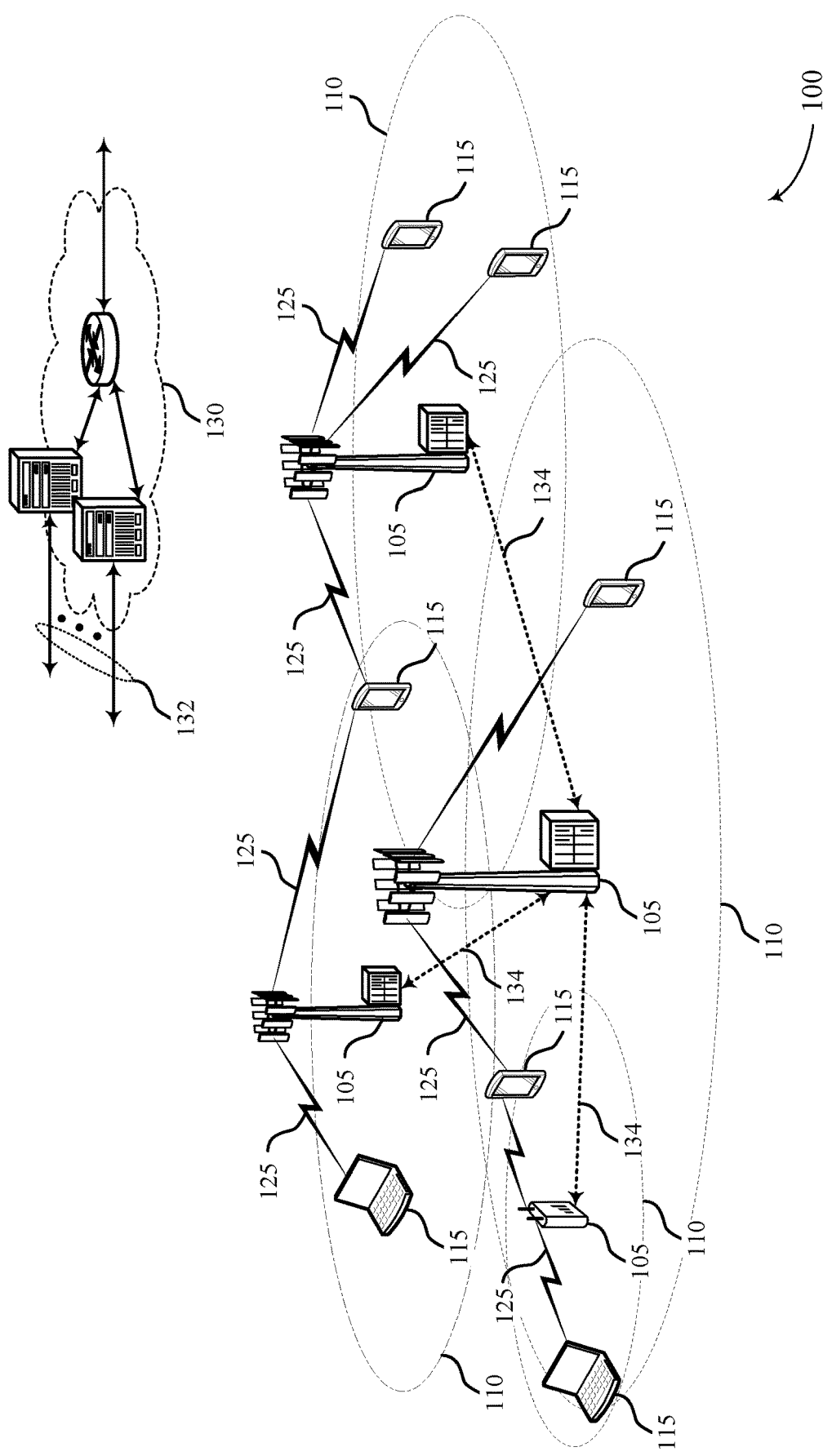
FIG. 1 illustrates an example of a system for wireless communication that supports bandwidth part activation, deactivation, and switching in wireless communications in accordance with aspects of the present disclosure.

Various described techniques provide for transmission of an indication of an activated bandwidth part (BWP) or component carrier (CC), or combination thereof, to a user equipment (UE) through downlink control information (DCI). In some cases, the DCI may or may not include a grant of resources of the BWP or CC. In some cases, a UE may establish a connection with a base station in which one or more CCs may be configured with one or more BWPs.

As indicated above, in some cases two or more BWPs may be configured for a CC that may be established between a UE and one or more base stations. In some cases, multiple CCs may be configured according to carrier aggregation (CA) techniques, which may include a primary carrier (also referred to as a PCell carrier or PCell) and one or more secondary CCs (also referred to as SCell carriers or SCells). Each CC may have one or more BWPs. For example, a PCell may be established such that an 80 MHz PCell bandwidth is divided into four 20 MHz BWPs. It will be readily recognized that numerous other examples of carrier bandwidth and BWPs can be used. In such an example, a default BWP, may be established, with three other BWPs that may be activated and deactivated based on traffic conditions. Thus, if a relatively small amount of data is to be transmitted, a single 20 MHz BWP may be used, and if larger amounts of data are present for transmission, two or more BWPs may be used.

In some examples, there may be one active BWP for downlink transmission and one active BWP for uplink transmission. In order to reduce power consumption at the UE, the base station may cause the UE to switch from a narrow bandwidth to a wide bandwidth (e.g., for receiving or transmitting relatively large amount of data) or vice versa (e.g., for receiving or transmitting relatively small amount of data). In some examples, the base station may indicate to the UE to activate, deactivate, or switch BWPs via L1 signaling (e.g., a DCI with grant) or a medium access control (MAC) control element (CE) transmitted over physical control shared data channel. However, such activation/deactivation/switching via a DCI with grant or a MAC CE may increase power consumption and latency at the UE. For example, a DCI with grant requires the UE to have already measured and reported to the base station channel conditions (e.g., a channel state information (CSI)) of a BWP selected by the base station for activation. Since the UE may not know in advance what BWP the base station may select, the UE may continuously monitor available BWPs, not just the BWP selected by the base station. Such continuous monitoring and reporting of the available BWPs may detrimentally impact power savings incurred for BWP switching.

In accordance with the techniques described herein, by using a DCI without grant (e.g., DCI excluding a grant), however, the base station may cause the UE to first activate and switch to a new selected BWP, and then ask for CSI of the selected BWP from the UE for scheduling resources within the selected BWP for the UE. As such, the UE may, in some examples, monitor and report CSI of only the selected BWP upon receiving the DCI without grant. Additionally, activation/deactivation/switching based on a DCI with grant may involve decoding of PDSCH resources allocated to the UE. Using a DCI without a grant beneficially may reduce latency as the UE does not have corresponding PDSCH resources to decode.

In some examples, a UE may take one or more measurements for each BWP or each CC that is to be used for transmissions. For example, a UE may perform channel state information (CSI) measurements for a BWP or a CC and provide a CSI measurement report to a base station, which may be used for setting one or more transmission parameters. Various techniques provided herein allow for configuration of one or more CCs that include one or more BWPs such that at least two BWPs are configured. A default BWP (e.g., a default BWP of a PCell) may be active, with any remaining BWPs (e.g., other BWPs of the PCell or one or more BWPs of one or more SCells) deactivated unless specifically activated by the base station. Upon activation of a BWP, the UE may perform CSI measurements and transmit a measurement report. Thus, monitoring and measurements of the deactivated BWPs may be avoided, which may provide power savings and more efficient resource usage. Furthermore, SCell activation and deactivation may be signaled based on whether or not a DCI indicates a BWP for one or more SCells is activated. In some cases, if any BWP of an SCell is activated, the SCell is considered to be activated and if all the BWPs of an SCell are deactivated, the SCell is considered to be deactivated. In such a manner, separate signaling for activation and deactivation of SCells may be avoided.

In some examples, the base station may transmit to the UE a DCI without grant for switching to a new BWP, and the UE may transmit an acknowledgment of receipt of the DCI without grant so that the base station may properly react to the received ACK. That is, if the base station receives an ACK, then the base station may determine that the UE has switched to the new selected BWP based on the DCI without grant. The base station may then deactivate the previous BWP, transmit a scheduling grant for the resources within the new BWP, etc.

If, however, the base station does not receive an ACK from the UE, the base station may not know whether the UE has already moved on to the new selected BWP, and thus, there may be a mismatch in frequency (e.g., out-of-synchronized active BWPs) between the base station and the UE. Thus, transmission of an ACK by the UE reduces possibility of such frequency mismatch. In some cases, the DCI without grant may indicate ACK resources the UE can use to transmit an ACK since the DCI without grant may not have a PDSCH including the ACK/NACK resource information as in a DCI with a grant. In such cases, the DCI without grant may include an information of preconfigured ACK/NACK resources for the UE to use in transmitting the ACK.

In some cases, an activated BWP may remain active until a BWP timer expires, or until a subsequent DCI indicates that an activated BWP is to be inactivated. In some cases, a table of combinations of activated BWPs and deactivated BWPs may be configured, and the DCI may include an index into the table to indicate which BWPs are active and which BWPs are inactive. In some cases, the DCI may include a bitmap that indicates which BWPs are active and which BWPs are inactive. In some cases, a UE may transmit an acknowledgment of receipt of the DCI to the base station using resources indicated in the DCI or in preconfigured acknowledgment resources. In some cases, one or more DCI transmissions may be received during a discontinuous reception (DRX) ON duration, or while a DRX inactivity timer is running which started during the DRX ON duration, or any combination thereof.

Aspects of the disclosure are initially described in the context of a wireless communications system. Examples of BWPs and CCs that may be activated and deactivated through DCI indications are then described. Aspects of the disclosure are further illustrated by and described with reference to apparatus diagrams, system diagrams, and flowcharts that relate to bandwidth part activation, deactivation, and switching in wireless communications.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices. In some cases, connections between one or more base stations 105 and one or more UEs 115 may use multiple BWPs, and a base station 105 may transmit DCI to indicate activated and deactivated BWPs, in which the DCI may or may not contain a grant for an activated BWP.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105, a UE 115, etc.) and a receiving device (e.g., a UE 115, a base station 105, etc.), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device (e.g., a base station 105 or a UE 115) or a receiving device (e.g., a base station 105 or a UE 115) to shape or steer an antenna beam (e.g., a transmit beam or a receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation). In one example, a base station 105 may use multiple antennas or antenna arrays to conduct beamforming operations for directional communications with a UE 115.

In some cases, wireless communications system 100 may be a packet-based network that operates according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or BWPs, or all of the carrier bandwidth. In other examples, some UEs 115 may be configured for operation using a narrowband protocol type that is associated with a predefined portion or range (e.g., set of subcarriers or resource blocks) within a carrier (e.g., "in-band" deployment of a narrowband protocol type). Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may comprise one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

As indicated above, in some cases, multiple BWPs may be configured for a communication link 125 between a base station 105 and a UE 115. A base station 105 may provide an indication of an activated BWP to a UE 115 through a DCI transmission that may or may not include a grant of resources of the BWP. In some cases, the UE 115 may establish the connection with the base station 105 in which one or more CCs may be configured with one or more BWPs and a CC may be activated through activation of one or more BWPs configured for the CC. Such a CC may be deactivated through deactivation of each BWP configured for the CC.

In some cases, the UE 115 may establish a connection with the base station 105 using a primary CC having a plurality of BWPs, each having a portion of a frequency bandwidth of the primary CC. The base station 105 may format first DCI including an indication to activate a selected BWP of a plurality of BWPs, the first DCI excluding a grant of resources of the selected BWP for the UE 115. The UE 115 may receive the first DCI from the base station 105 and activate the selected BWP based at least in part on the first DCI. Since there is typically one active BWP for downlink transmissions and one active BWP for uplink transmissions, if the base station 105 determines that the UE may communicate using a second selected BWP from the selected BWP the UE is currently using, the base station 105 may transmit one or more additional DCI.

For example, the base station 105 may transmit to the UE 115 a second DCI including an indication to deactivate the selected BWP. The UE 115 may deactivate the selected BWP based on the indication received in a second DCI and switch to a second selected BWP of the plurality of BWPs. The UE 115 may transmit an acknowledgment to the base station 105 that indicates the second DCI was successfully received. The second DCI may not include a grant of resources of the second selected BWP for the UE so as to reduce power consumption (e.g., by enabling the UE 115 to monitor and report CSI of the second selected BWP only) and latency at the UE 115 (e.g., since the second DCI does not have a grant of resources for the UE 115 to use, and thus, the UE 115 does not need to monitor and decode a PDSCH for the second DCI).

In some cases, the UE 115 may deactivate the selected BWP upon an expiration of a predetermined timer associated with the selected BWP. Further, if the base station 105 decides that the UE 115 may use a secondary CC (e.g., due to a low data traffic), the base station 105 may format the first DCI to include an indication to activate a secondary CC. The secondary CC may be configured with a default BWP, which may be a dormant or zero BWP indicated as active. The zero BWP may include null attributes or zero bandwidth, and thus, the secondary CC may be considered deactivated when the zero BWP is switched on. Each of the BWPs of the SCell may be associated with a respective BWP ID field (e.g., BWP code point), and the UE 115 may deactivate the SCell via a zero BWP. For example, the UE 115 may switch from an activated BWP to the zero BWP by indicating that a zero BWP ID field is activated instead of a BWP ID field of the previously activated BWP, and this switch to the zero BWP may effectively deactivate the SCell. Even when the zero BWP is switched on (e.g., the zero BWP ID field is indicated as activated), the SCell may remain available to the UE 115 for some purposes (e.g., for performing channel measurements), but may not be used by the UE 115 for other purposes (e.g., PDSCH and/or PUSCH transmissions via one or more non-zero BWPs of the SCell). If the base station 105 determines that a BWP that is not a zero BWP should be active, the indication to activate the secondary CC may include an indication to activate one or more BWPs, that are not a zero BWP. As such, the UE 115 may activate one or more BWPs (e.g., a zero BWP, a dormant BWP, a BWP that is not a zero BWP, etc.) of the secondary CCs based at least in part on the indication to activate the secondary CC.

Thus, the base station 105 may simultaneously activate the secondary CC and one or more BWPs of the secondary CC by using the first DCI, thereby reducing power consumption by the UE 115 and facilitating fast activation/switching of the BWPs of the secondary CC by the UE 115. In some cases, the UE 115 may transmit, within an uplink control channel, a transmission in accordance with power control for the selected BWP, the selected BWP being an uplink BWP. Thus, the UE 115 may control inner loop power for uplink transmission based on, e.g., switching of uplink BWPs.

Figure 2:
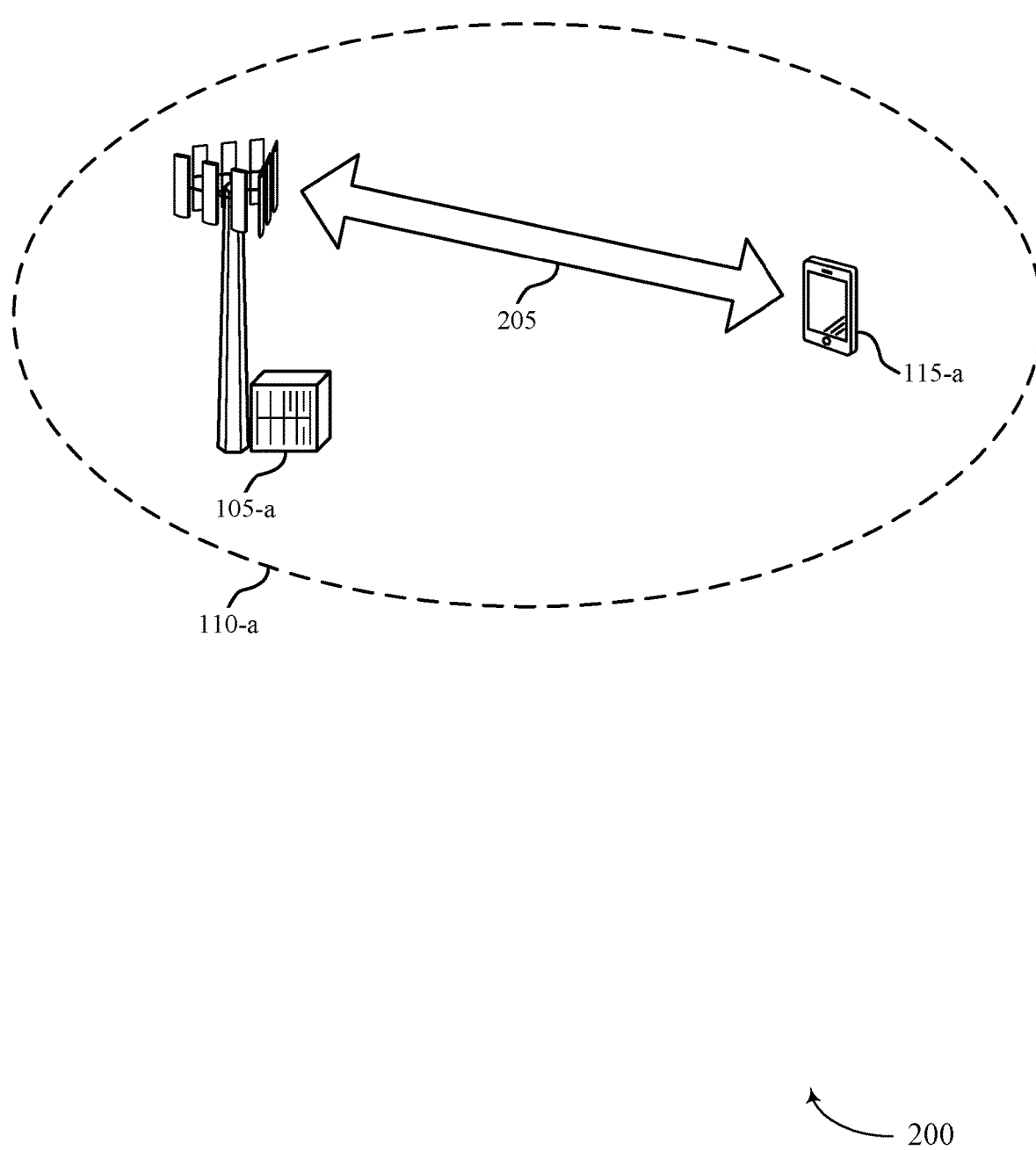
FIG. 2 illustrates an example of a wireless communications system that supports bandwidth part activation, deactivation, and switching in wireless communications in accordance with aspects of the present disclosure.

FIG. 2 illustrates an example of a portion of a wireless communications system 200 that supports bandwidth part activation, deactivation, and switching in wireless communications in accordance with various aspects of the present disclosure. In some examples, wireless communications system 200 may implement aspects of wireless communications system 100. In the example of FIG. 2, the wireless communications system 200 may include a base station 105-*a*, which may be an example of a base station 105 of FIG. 1. The wireless communications system 200 may also include a UE 115-*a*, which may be an example of a UE 115 of FIG. 1, that is located within coverage area 110-*a* of the base station 105-*a*.

In the example of FIG. 2, the base station 105-*a* and the UE 115-*a* may establish a connection 205. In some cases, the connection 205 may have one or more wideband CCs. As indicated above, in some cases one or more of the CCs may include one or more BWPs. For example, a primary CC may include two or more BWPs, and a secondary CC may include one or more BWPs. In some cases, the base station 105-*a* may configure the connection 205 with two or more BWPs, and may activate and deactivate one or more of the BWPs through DCI signaling. In some cases, a first BWP may be active by default and a second BWP may be inactive by default, and the base station 105-*a* may activate the second BWP through transmitting a DCI to the UE 115-*a* that indicates the second BWP is to be activated, in which the DCI does not include a grant of resources for the second BWP.

The UE 115-*a* may receive the DCI and, in some cases, acknowledge receipt of the DCI, perform one or more channel measurements for the second BWP, and transmit a measurement report to the base station 105-*a*. The base station 105-*a* may transmit data to the UE 115-*a*, or receive data from the UE 115-*a*, via the first BWP and the second BWP. In some cases, activation and deactivation of a downlink BWP may be supported by a timer for the UE 115-*a*, in which following the activation of two or more BWPs, the UE 115-*a* may switch its active downlink BWPs to a default downlink BWP. In cases that use TDD, separate sets of BWP configurations for downlink and uplink may be provided per CC. In such cases, the UE 115-*a* may have different active downlink and uplink BWPs that are configured or activated, and the UE 115-*a* may not be expected to retune the center frequency of the channel bandwidth between downlink and uplink transmissions.

As discussed above, in some cases one or more BWPs may be activated by the base station 105-*a* via a scheduling DCI with grant (e.g., DCI including an indication of a selected BWP and information for allocating resources of a PDSCH to the UE within the selected BWP) or without a grant (e.g., a DCI including an indication of a selected BWP that does not allocate resources of PDSCH within the selected BWP to the UE), that is transmitted to the UE 115-*a*. In some examples, multiple BWPs may be configured, but CSI measurements may not need to be taken and reported by the UE 115-*a* prior to activation of a BWP. In some examples, the base station 105-*a* may perform scheduling for a BWP based on CSI information that is obtained after the BWP is activated at the UE 115-*a*. Thus, the UE 115-*a* may defer making CSI measurements and providing a measurement report until the BWP is activated, which may help to conserve power and wireless resources.

In some cases, the DCI may include an indication of which BWPs are active for a particular transmission or for a time period of a predetermined timer. The UE 115-*a*, upon receiving the DCI, may activate the BWPs indicated as active, and deactivate any previously active BWPs that are no longer indicated as being active. In some cases, a BWP timer may be configured and an activated BWP may remain active for the duration of the BWP timer unless a DCI is received that deactivates the BWP sooner.

When the UE 115-*a* receives the DCI that activates a BWP without a grant, the UE 115-*a* may transmit an ACK/NACK response. In cases where the DCI that activates the BWP does not include a grant, the resource for the ACK/NACK response may be identified by the UE 115-*a* in the absence of the grant. In some cases, the ACK/NACK resource may be determined based on an indication of an ACK/NACK resource within the DCI (e.g., an identification of an uplink resource that may be used to transmit an acknowledgment of receipt of the DCI). In some cases, the base station 105-*a* may configure a number of available ACK/NACK resources that may be used in such cases, and the DCI may indicate which of the configured ACK/NACK resources are to be used by the UE 115-*a* (e.g., the DCI may include an index into a list of configured ACK/NACK resources).

In cases where the connection 205 includes multiple CCs, similar activation and deactivation techniques may be used similar to those discussed above. For example, an SCell may be configured with one or more BWPs, and the base station 105-*a* may transmit DCI that indicates that a particular BWP for an SCell is to be activated. If one or more BWPs of an SCell are activated, the SCell may be considered to be activated, and if all of the BWPs of the SCell are deactivated, the SCell may be considered to be deactivated. SCell activation may be based on a timer, similarly as discussed above, in which an SCell may remain active until expiration of the timer or until a subsequent DCI is received that deactivates the SCell prior to the expiration of the timer. In some cases, one or more SCells may have multiple BWP configurations, including, for example, configurations for control resource set (CORESET) (e.g., that configures physical resources for transmission of control information to a UE), numerology, semi-static HARQ timeline, other parameters, or any combination thereof.

Through techniques provided herein, an indication of zero BWPs for an SCell in a DCI transmission may be used as SCell deactivation, and an activation of one or more BWPs for the SCell may be used to activate the SCell, and thus separate dedicated SCell activation/deactivation signaling may not be used. In some cases, each configured SCell may have a default BWP in which there are no active BWPs. In such cases, CA may be used after all of the BWPs of the PCell are fully utilized. In some cases, for cross-carrier BWP activation (i.e., SCell activation) from zero active BWPs, DCI without a resource grant may be used exclusively to activate the SCell, and DCI with a resource grant may not be used. By using only DCI without a resource grant, when the base station 105-*a* attempts to decode ACK/NACK it will only decode the ACK/NACK for the DCI. If a DCI with a grant were transmitted, different ACK/NACK decoding attempts may be needed which may complicate decoding. In some cases, BWP activation, deactivation, and switching (i.e., switching from one BWP to another BWP) is performed across slots, and not within a same slot as the DCI.

In some examples, for an SCell, a default BWP may be a zero BWP. BWP configuration may be included as part of SCell configuration provided by the base station 105-a to the UE 115-a, as the BWP may associate with the SCell. SCell activation and deactivation may be based (e.g., strictly based) on the state of the BWP associated with the SCell. In some examples, there may be at least one BWP configured for the SCell, and there may be a BWP designated as the default BWP (e.g., must designate a particular BWP as a default BWP). In some examples, the default BWP may be the BWP for timer fallback. In some examples, the default BWP may be a dormant or zero BWP, and the zero BWP may be a BWP with null attributes, including zero bandwidth. In some examples, a zero BWP may be implicitly configured for each SCell, and the zero BWP may be associated with a BWP ID of zero that is implicitly configured to be the default BWP for the SCell. In some examples, if an SCell is configured without any explicit configuration for additional BWP, the zero BWP may be implicitly configured as the default BWP. In some examples, the SCell may be configured with the zero BWP initially being active. In some examples, a SCell may be considered activated when configured and one of its associated BWP excluding the zero BWP is active. An SCell may be activated when the active BWP is switched away from the zero BWP. The SCell may be considered deactivated when configured and the zero BWP is active. When the timer expires, active BWP is switched to the default BWP which is the zero BWP to deactivate the SCell (e.g., implies SCell is deactivated). Even when the zero BWP is switched on (e.g., the zero BWP ID field is indicated as activated), the SCell may remain available for the UE 115 to perform channel measurements. There can be explicit BWP switching DCI to switch the active BWP to the zero BWP. This also effectively deactivates the SCell.

In some cases, for an SCell configured with one or more BWPs, a default BWP may be a dormant or zero BWP, e.g., a BWP with null attributes including zero bandwidth. In some examples, the zero BWP may be implicitly configured for each SCell, and may be associated with BWP identifier (ID) of zero. As such, if an SCell is configured without any explicit configuration for one or more additional BWPs, there a still is at least one BWP (e.g., the zero BWP which is also the default BWP) that may be implicitly configured for the SCell. An SCell may start with a zero BWP indicated as active, and the SCell with an active zero BWP is considered to be deactivated. Each of the BWPs of the SCell may be associated with a respective BWP ID field (e.g., BWP code point). The UE 115 may switch from an activated BWP to the zero BWP by indicating that a zero BWP ID field is activated instead of BWP ID field of the previously activated BWP, and this switch to the zero BWP may effectively deactivate the SCell. Even when the zero BWP is switched on (e.g., the zero BWP ID field is indicated as activated), the SCell may remain available for the UE 115 to perform, for example, channel measurements. An SCell may be considered activated if a BWP, which is not a zero BWP, is indicated as active. To activate one or more SCells, the base station may transmit a DCI on an active BWP of a PCell. In some examples, a single SCell may be activated via a dedicated DCI without grant, which includes a carrier indicator field to indicate to the UE to activate the single SCell and a BWP ID for the BWP to be activated on that SCell. In some examples, multiple SCells may be activated via a group DCI without grant, which includes information for one or more BWPs configured for the SCells in an array of BWP ID fields, each BWP ID field corresponding to a configured SCell and indicating which BWP should be activated.

When a single SCell is configured, it starts with the zero BWP and is considered not activated. The base station may activate the SCell with a BWP DCI transmitted on the active BWP of the PCell. For switching the active BWP on the PCell, a scheduling DCI (containing target ID) may be used. The SCell may be activated if the active BWP is switched to a BWP (which is configured for the SCell) other than the zero BWP. In some examples, a scheduling grant may or might not be used to trigger BWP switching for SCell, depending on whether cross-carrier scheduling is supported, and scaling for group activation of multiple SCells and the BWP ID for the BWP to be activated on that SCell. In some examples, a dedicated BWP DCI (without grant) may be used. For SCell BWP activation from PCell, the BWP DCI may contain a carrier indicator field (CIF) to indicate the SCell, as well as the BWP ID for the BWP to be activated on that SCell. In some examples, the UE may send ACK for successful decoding of the BWP DCI. The dedicated BWP DCI may specify the uplink control resources to be used for transmission of the ACK.

In some cases, one or more SCells may be deactivated by a DCI without grant. In one example, multiple SCells may be deactivated via a group DCI transmitted on the PCell's active BWP. An array of BWP ID fields may be set or cleared in accordance with the desired activation/deactivation state of respective SCells as indicated in the group DCI. For example, a BWP ID field set to zero may indicate the zero BWP is active, and thus, the SCell associated with the BWP ID field is deactivated. In some cases where the default BWP is also a zero BWP, a timer expiration may cause switching of the active BWP to the zero BWP, thereby causing the respective SCell to be deactivated. Even when the zero BWP is switched on (e.g., the zero BWP ID field is indicated as activated), the SCell may remain available for the UE 115 to perform channel measurements. The timer may expire due to, e.g., scheduling inactivity, an error condition between the base station and the UE (e.g., a frequency mismatch, or an out-of-synchronization on the active BWP), or any combination thereof.

When one or multiple SCells are configured, they may start with the zero BWP and are considered not activated. The base station may activate the SCells with a BWP DCI transmitted on the active BWP on the PCell. In some examples, if multiple SCells are to be activated, instead of sending individual BWP DCI to activate each BWP configured for different SCell, a group BWP DCI may be used. Group BWP DCI may not include a grant, and may include the activation information for the BWP configured for the SCell (e.g., an array of BWP ID fields). Each BWP ID field may correspond to a configured SCell, and the BWP ID may indicate which BWP should be activated (or set to 0 to indicate the zero BWP, i.e., the SCell is deactivated). Similar to BWP DCI to activate a single SCell, the UE may send an ACK for successful decoding of the group BWP DCI. The dedicated BWP DCI may specify the uplink control resources to be used for transmission of the ACK.

As indicated above, the DCI transmitted by the base station 105-a may include an indication to the UE 115-a to activate or deactivate one or more BWPs. In some cases, the DCI may include an index into a table, in which each entry in the table has a combination of activated and deactivated BWPs, and in cases where multiple CCs are configured, one entry in the table may correspond to zero BWP for an SCell. In some cases, the table of combinations may be configured at the UE 115-*a* in radio resource control (RRC) signaling, and the DCI may include an index into the table that the UE 115-*a* may use to determine which BWPs are activated and deactivated. In other cases, the base station 105-*a* may configure a number of BWPs which may have an order, and the DCI may include a bitmap in which each bit indicates activated and deactivated BWPs in accordance with the order of the number of BWPs.

The UE 115-*a* may, in some cases, perform uplink power control when switching active BWPs. In some cases, if a downlink BWP switches from one to another, but uplink BWP remains the same, the PUSCH or PUCCH inner loop power control at the UE 115-*a* may remain unchanged. In some cases, if uplink BWP switches, the inner loop power control for PUSCH, PUCCH, or both, may be reset. In further examples, inner loop uplink power control can be considered independent of uplink BWP switching.

For example, uplink power control may be defined per uplink BWP, and, in some cases, uplink power control may be independent of uplink BWP switching. In an example, inner loop power control applied to a particular uplink BWP may be based on a uplink power control definition for that particular uplink BWP. In some examples, the same uplink power control definition may be applied to multiple uplink BWPs, such as to a first uplink BWP that is activated before a switch and a second BWP that is activated after the switch. Thus, the UE 115-*a* may apply the same uplink power control before and after the switch. In some examples, a first uplink power control definition may be applied to a first uplink BWP that is activated before a switch, and a second UL power control definition may be applied to a second uplink BWP that is activated after the switch. Thus, the UE 115-*a* may apply a different uplink power control before and after the switch.

Figure 3:
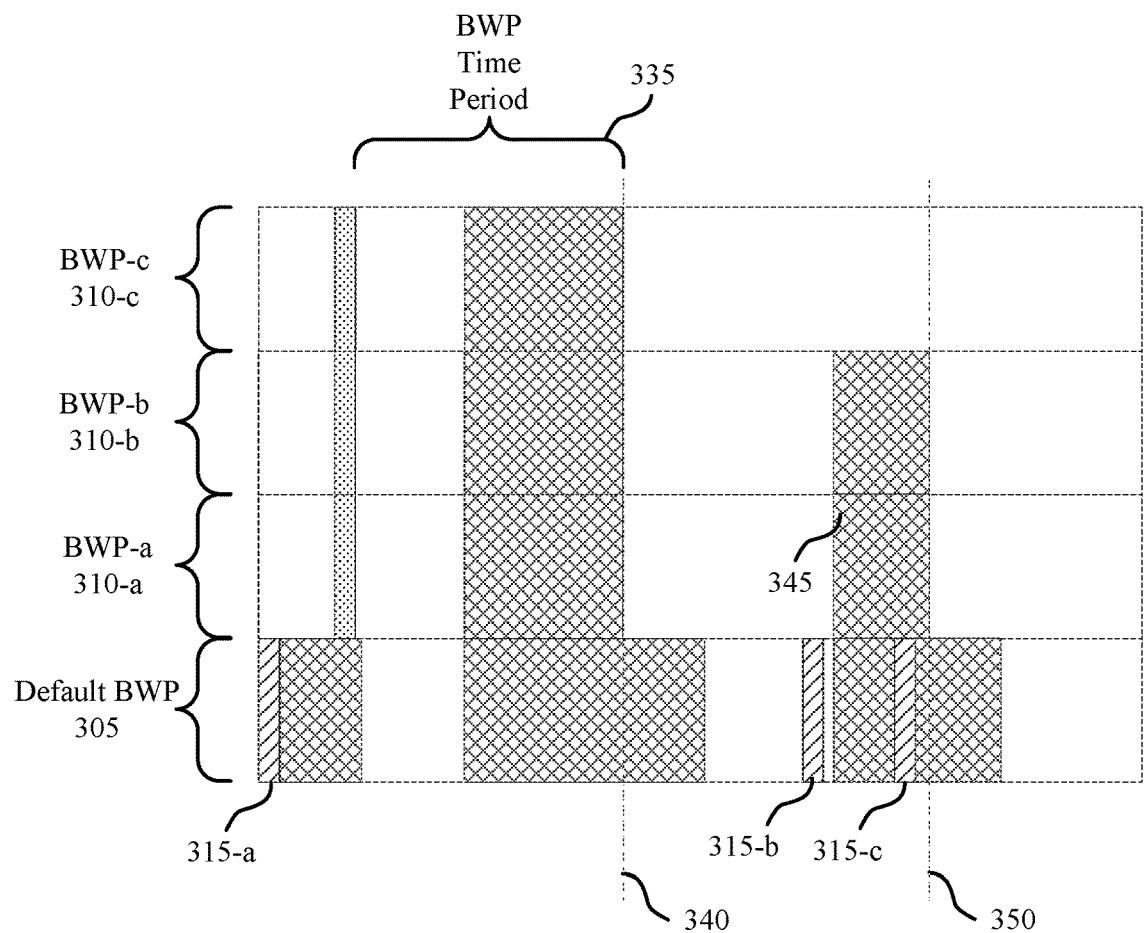
FIG. 3 illustrates an example of a channel with multiple bandwidth parts (BWPs) that supports bandwidth part activation, deactivation, and switching in wireless communications in accordance with aspects of the present disclosure.
Figure 3:
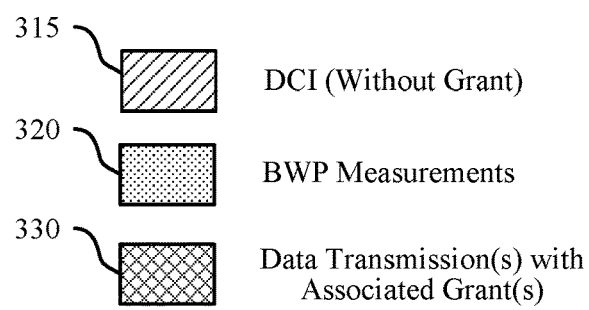

FIG. 3 illustrates an example of a channel 300 with multiple BWPs that supports bandwidth part activation, deactivation, and switching in wireless communications in accordance with various aspects of the present disclosure. In some examples, the channel 300 with multiple BWPs may be used for transmissions between base stations 105 and UEs 115 of FIGS. 1 and 2. In this example, the channel 300 may be a channel for a primary component carrier, and may include four BWPs. In this example, a default BWP 305 may be used for communications between a base station 105 and a UE 115 and may always be activated. The default BWP 305 may be used to transmit, for example, PDCCH transmission such as DCI that may be used to control activation, deactivation, and switching of the other BWPs 310, which include BWP-a 310-*a*, BWP-b 310-*b*, and BWP-c 310-*c*.

As discussed above, in some cases a DCI 315 may be transmitted by the base station 105 that may not include a grant, and that may indicate to the UE 115 that one or more of the other BWPs 310 are to be activated. In this example, a first DCI 315-*a* may indicate that each of BWP-a 310-*a*, BWP-b 310-*c*, and BWP-c 310-*c* are to be activated. The UE 115 may receive the first DCI 315-*a* and transmit an acknowledgment of receipt of the DCI (e.g., using uplink resources indicated in the first DCI 315-*a*). The UE 115 may perform BWP measurements 320 for each of the activated BWPs 310, and may provide a measurement report to the base station. The base station 105 may provide data transmission(s) with associated grant(s) 330 in BWP time period 335 that may transmit data on the default BWP 305 and each of the other BWPs 310 of the channel 300. In some cases, the activation of the other BWPs 310 may initiate a timer that corresponds to the BWP time period 335, and the other BWPs 310 may be automatically deactivated at the expiration 340 of the BWP time period 335. The timer may be renewed or extended each time when a data transmission with associated grant occurs within 330.

In the example of FIG. 3, another DCI 315-*b* without a grant may indicate only BWP-a 310-*a* and BWP-b 310-*b* are activated. The UE 115 may, in such a case, deactivate BWP-c 310-*c* and receive data transmission(s) with associated grant(s) 345 via BWP-a 310-*a* and BWP-b 310-*b*. Further, in this example, a subsequent DCI 315-*c* without a grant may be transmitted by the base station 105 and received at the UE 115 that deactivates all of the other BWPs 310 other than the default BWP 305, and the UE 115 may deactivate each of the other BWPs 310 at point 350, which may be prior to the expiration of the BWP time period.

Figure 4:
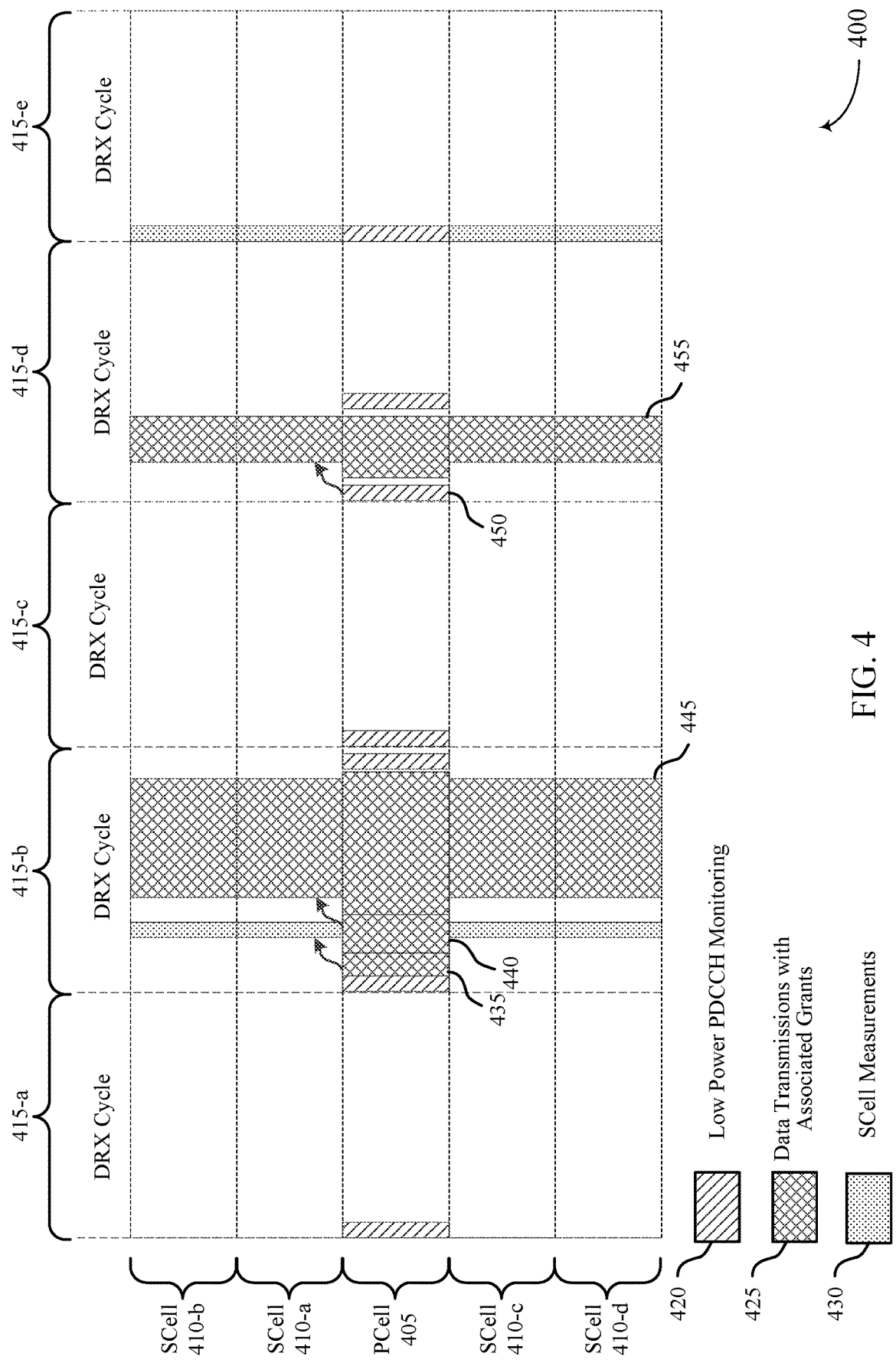
FIG. 4 illustrates an example of a number of component carriers (CCs) that support bandwidth part activation, deactivation, and switching in wireless communications in accordance with aspects of the present disclosure.

FIG. 4 illustrates an example of a number of CCs 400 that supports bandwidth part activation, deactivation, and switching in wireless communications in accordance with various aspects of the present disclosure. In some examples, the CCs 400 may implement aspects of wireless communications system 100 or 200. In this example, the CCs 400 may include a PCell CC 405, and a number of SCell CCs 410. While each of the PCell 405 and the SCells 410 is shown as occupying a particular bandwidth, one or more of these CCs 400 may have two or more BWPs, in some examples. Further, in this example the base station 105 and UE 115 may be operating according to a connected mode discontinuous reception (DRX) technique across a number of DRX cycles 415.

In this example, SCells 410 may be activated and deactivated via BWP DCI signaling as discussed above, which may facilitate fast activation and deactivation of SCells 410, and thus may save power and resources at a UE 115. In some 4G/LTE deployments, SCell carrier activation and deactivation may be signaled using a medium access control (MAC) control element (CE), which may be a relatively slow procedure that activates and deactivates SCells at a time scale that spans multiple DRX cycles 415, and may not adapt to traffic scheduling conditions that may change at sub-DRX cycle 415 intervals. Such activation and deactivation may thus result in power consumption to monitor SCells 410 that may not be used to transmit data. According to various techniques provided herein, power consumption may be reduced through faster activation and deactivation of the SCells 410.

In some cases a base station 105, based on an application or longer term traffic loading, may decide to configure SCells 410 for a UE 115. Based on the previously described BWP activation, deactivation, and switching, techniques, each SCell 410 may have a default setting of zero BWP, or an inactive state. Within a DRX cycle 415, during active time (ON duration and/or inactivity timer is running), if a sufficient amount of data needs to be sent to the UE 115, the base station 105 can decide to activate one or multiple SCells 410 via BWP DCI signaling. When the traffic burst has ended, the SCells 410 can be deactivated in a manner such as described above, such as upon an SCell timer expiration triggers that operates similar to the BWP time period as discussed above, or an explicit BWP DCI to switch back to zero BWP for the SCells 410, effectively deactivating the SCells 410. In some cases, if the application or longer term traffic loading has changed, the base station 105 may deconfigure some or all of the SCells 410, and/or configure another set of SCells.

In the example of FIG. 4, the UE 115 may perform periodic low power PDCCH monitoring 420. In this example, such monitoring may indicate that, during a first DRX cycle 415-*a*, no data transmissions 425 are transmitted to the UE 115. During a second DRX cycle 415-*b*, DCI transmitted by the base station 105 and received at the UE transmissions 435 may indicate that BWPs associated with each of the SCells 410 are to be activated. The UE 115 may perform SCell measurements 430 and may provide a measurement report to the base station 105, before which, transmissions 440 may still be confined to the PCell 405. After the base station 105 receives the measurement report, transmissions 445 may be used by each of the SCells 410. In this example, the SCells 410 may be deactivated within the second DRX cycle 415-*b* based on a timer expiration or based on an explicit deactivation indicated in a subsequent DCI. Continuing with the example of FIG. 4, a third DRX cycle 415-*c* may not have any PCell 405 or SCell 410 transmissions, and the UE 115 may maintain the SCells 410 as deactivated and thus save power. During fourth DRX cycle 415-*d*, DCI 450 may be received that indicates each of the SCells 410 are to be activated, and the UE 115 may activate the SCells 410 and receive transmissions 455 via the PCell 405 and each of the SCells 410. In this case, a DCI received during the transmissions 455 may indicate that the SCells 410 are to be deactivated, and the UE 115 may deactivate the SCells 410 prior to the end of the fourth DRX cycle 415-*d*.

Figure 5:
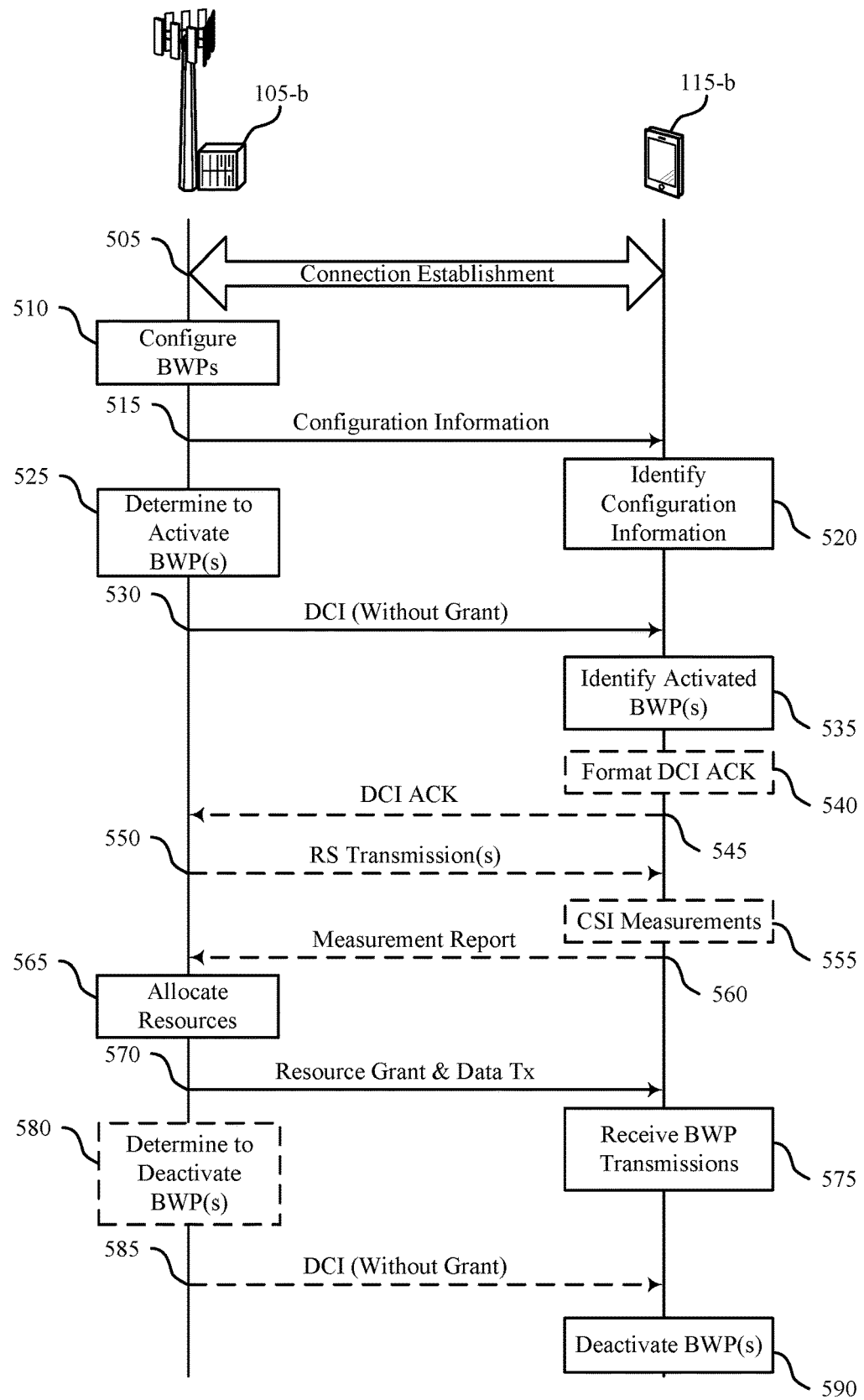
FIG. 5 illustrates an example of a process flow that supports bandwidth part activation, deactivation, and switching in wireless communications in accordance with aspects of the present disclosure.

FIG. 5 illustrates an example of a process flow 500 that supports bandwidth part activation, deactivation, and switching in wireless communications in accordance with various aspects of the present disclosure. In some examples, process flow 500 may implement aspects of wireless communications system 100 or 200. Process flow 500 may include the transmission of DCI that is used to activate or deactivate BWPs that may be configured between a base station 105-*b*, which may be an example of a base station 105 of FIG. 1 or 2, and a UE 115-*b*, which may be an example of a UE 115 of FIG. 1 or 2. Initially, the base station 105-*b* and UE 115-*b* may establish a connection 505. Such a connection establishment may be performed using established connection establishment techniques. In some cases, the connection 505 may include two or more configured CCs in a CA mode connection.

At 510, the base station 105-*b* may configure BWPs of the connection 505. In some cases, the BWPs may be portions of a bandwidth of a carrier that is established between the base station 105-*b* and the UE 115-*b*. In some cases, two or more CCs may be established, and each of the CCs may have two or more BWPs. In some cases, each CC may have a single BWP, and each CC may correspond to a BWP. The base station 105-*b* may configure the BWPs based on, for example, bandwidth capabilities of the UE 115-*b*, an application that is transmitting data and associated data rates of the application, a historic traffic pattern that may indicate increased or decreased amounts of data are likely to be transmitted between the UE 115-*b* and the base station 105-*b*, or any combination thereof. In some cases, the configuration may include a table with entries that correspond to different combinations of BWPs that may be activated or deactivated. In some cases, the configuration may include an ordering of the BWPs that may be used to identify activated or deactivated BWPs in a bitmap. In some cases, the configuration includes an indication of one or more resources that may be used by the UE 115-*b* to transmit an acknowledgment of DCI received at the UE 115-*b*. In some cases, the configuration includes a timer associated with one or more of the BWPs that may be used to deactivate a BWP following activation of the BWP. The base station 105-*b* may transmit the configuration information 515 to the UE 115-*b*.

At 520, the UE 115-*b* may identify the configuration information. In some cases, the UE 115-*b* may configure one or more CCs with one or more BWPs in accordance with the configuration. In some cases, the UE 115-*b* may identify that the configuration includes a table with entries that correspond to different combinations of BWPs that may be activated or deactivated. In some cases, the configuration may include an ordering of the BWPs that may be used to identify activated or deactivated BWPs in a bitmap.

At block 525, the base station 105-*b* may determine to activate one or more BWPs. Such a determination may be made, for example, based on an amount of data traffic present to be transmitted to the UE 115-*b*, based on a buffer status report of the UE 115-*b* indicating data to be transmitted to the base station 105-*b*, of combinations thereof. In some cases, the base station 105-*b* may determine which of the configured BWPs to activate. In some cases, one or more BWPs may correspond to one or more different CCs, and the determination to activate BWPs may be based on a determination to activate one or more of the CCs.

The base station 105-*b* may transmit DCI 530 to the UE 115-*b*. As discussed above, in some cases the DCI 530 may indicate that the one or more BWPs are to be activated, and does not include a grant for the one or more BWPs.

The UE 115-*b* may, at 535, identify the activated BWPs. In some cases, the activated BWPs may be determined based on an index provided in the DCI that indicates a table entry with an associated combination of activated and deactivated BWPs. In some cases, the DCI may include a bitmap that indicates which BWPs are activated and deactivated.

The UE 115-*b* optionally may, at 540, format a DCI acknowledgment and transmit the DCI acknowledgment 545 back to the base station 105-*b*. In some cases, the UE 115-*b* may determine a resource for the DCI acknowledgment 545 transmission based on information in the DCI 530. In some cases, the DCI 530 may include an index to a list of available configured resources for the DCI acknowledgment 545 transmission.

The base station 105-*b* optionally may transmit one or more reference signal transmissions 550, that the UE 115-*b* may use for CSI measurements at 555. In some cases, the UE 115-*b* may perform CSI measurements 555 for each of the activated BWPs. In cases where CSI measurements 555 are made, the UE 115-*b* may transmit a measurement report 560 to the base station 105-*b*. The base station 105-*b* may use the CSI measurements to set one or more transmission parameters (e.g., MCS, power control, etc.) for transmissions using the activated BWP(s).

The base station 105-*b* may, at 565, allocate resources for transmissions of the activated BWP(s). In some cases, the allocation of resources may include transmission resources for each of the activated BWPs, and for a default BWP. In cases where one or more of the activated BWPs indicated activation of a SCell, the allocation of resource may include allocation of SCell resources for transmissions. At 570, the base station 105-*b* may transmit the resource grant and may transmit downlink data to the UE 115-*b* in cases where the resource grant includes a downlink grant. In some cases, the resource grant 570 may include an uplink grant using one or more of the activated BWPs.

The UE 115-*b* may, at 575, receive the resource grant BWP transmissions, and decode the downlink transmissions. In cases where the resource grant includes an uplink grant, the UE 115-*b* may format and transmit corresponding uplink transmissions to the base station 105-*b* using activated BWPs identified in the resource grant.

The base station 105-*b* optionally may, at block 580, determine to deactivate one or more of the activated BWPs, or may determine to switch between activated BWPs. Such a determination may be made, for example, based on an amount of remaining data traffic to be transmitted, for example, and a capacity of the different BWPs. The base station 105-*b* may optionally transmit DCI 585, without a resource grant, indicating the deactivated or switched BWPs to the UE 115-*b*.

The UE 115-*b* may, at 590, deactivate one or more of the activated BWPs. In some cases, the UE 115-*b* may determine to deactivate a BWP based on an expiration of a timer associated with the BWP, and a lack a receipt of any DCI that may indicate that the BWP is to remain activated. In some cases, the UE 115-*b* may receive the DCI 585 that may explicitly indicate that one or more BWPs are to be deactivated.

Figure 6:
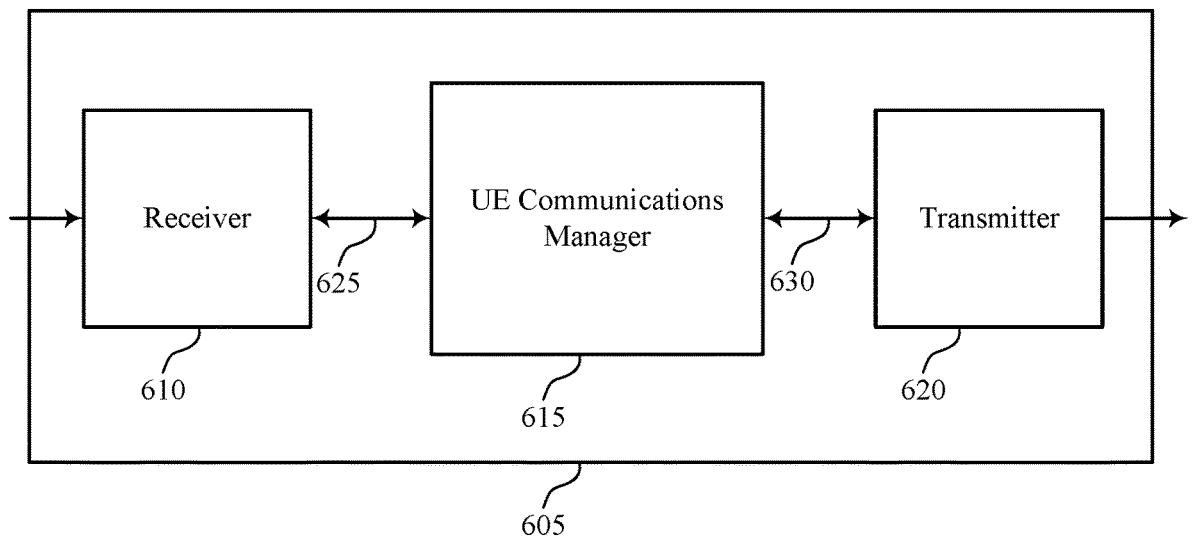
FIGS. 6 through 8 show block diagrams of a device that supports bandwidth part activation, deactivation, and switching in wireless communications in accordance with aspects of the present disclosure.

FIG. 6 shows a block diagram 600 of a wireless device 605 that supports bandwidth part activation, deactivation, and switching in wireless communications in accordance with aspects of the present disclosure. Wireless device 605 may be an example of aspects of a UE 115 as described herein. Wireless device 605 may include receiver 610, UE communications manager 615, and transmitter 620. Wireless device 605 may also include a processor. Each of these components may be in communication with one another (e.g., via one or more buses).

Receiver 610 may monitor a control channel for a downlink transmission, and receive information such as packets, user data, or control information associated with various information channels (e.g., control channels, data channels, and information related to bandwidth part activation, deactivation, and switching in wireless communications, etc.). The received information may be passed on to other components of the device 605. Receiver 610 may transmit at least the received information 625 to UE communications manager 615 via an electrical connection (e.g., a wire or a bus). The receiver 610 may be an example of aspects of the transceiver 935 described with reference to FIG. 9. The receiver 610 may utilize a single antenna or a set of antennas.

UE communications manager 615 may receive the information transmitted from receiver 610 via an electrical connection, and perform various functions described herein. UE communications manager 615 may be an example of aspects of the UE communications manager 915 described with reference to FIG. 9.

UE communications manager 615 and/or at least some of its various sub-components may be implemented in hardware, software executed by a processor, firmware, or any combination thereof. If implemented in software executed by a processor, the functions of the UE communications manager 615 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The UE communications manager 615 and/or at least some of its various sub-components may be physically located at various positions, including being distributed such that portions of functions are implemented at different physical locations by one or more physical devices. In some examples, UE communications manager 615 and/or at least some of its various sub-components may be a separate and distinct component in accordance with various aspects of the present disclosure. In other examples, UE communications manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 615 may receive the information 625 from receiver 610 via an electrical connection, and based at least in part on the information 625, UE communications manager 615 may establish, at a UE 115, a connection with a base station 105 using a primary CC, the primary CC having a set of BWPs each having a portion of a frequency bandwidth of the primary CC, receive first DCI, the first DCI including an indication to activate a selected BWP of the set of BWPs, the first DCI excluding a grant of resources of the selected BWP for the UE 115, and activate the selected BWP based on the first DCI.

In some cases, UE communications manager 615 may deactivate the selected BWP based at least in part on an indication received in a second DCI or an expiration of a predetermined timer associated with the selected BWP. In some cases, UE communications manager 615 may receive a second DCI including an indication to switch from the selected BWP to a second selected BWP of the plurality of BWPs, the second DCI excluding a grant of resources of the second selected BWP for the UE. In some cases, UE communications manager 615 may cause transmitter 620 to transmit an acknowledgment to the base station 105 that indicates the second DCI was successfully received. In some cases, the first DCI may further include an indication to activate a secondary CC. In some cases, UE communications manager 615 may activate one or more BWPs of the secondary CC based at least in part on the indication to activate the secondary CC. In some cases, UE communications manager 615 may deactivate the secondary CC via a zero BWP.

Transmitter 620 may receive signals generated by other components of the device 605, and transmit at least the received signals to other components of the device 605, or a base station 105. In some cases, transmitter 620 may transmit, within an uplink control channel, a transmission in accordance with power control for the selected BWP, wherein the selected BWP is an uplink BWP. In some cases, transmitter 620 may receive a signal 630 including an acknowledgment indicating the first DCI was successfully received or an indication of one or more measured channel characteristics of BWPs (e.g., a selected BWP for activation) via an electrical connection. Transmitter 620 may then transmit the acknowledgment or the indication to the base station 105. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Figure 7:
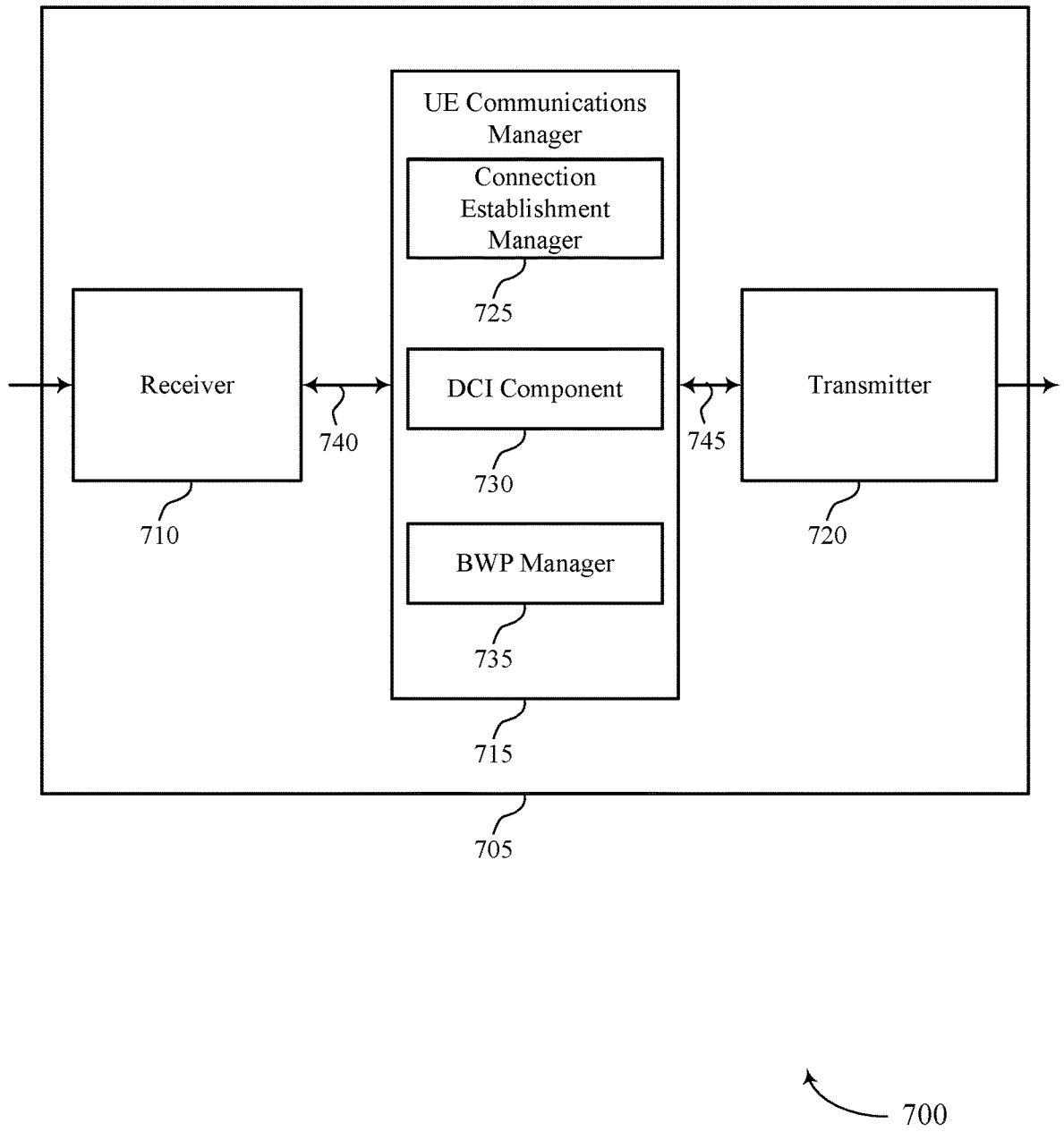

FIG. 7 shows a block diagram 700 of a wireless device 705 that supports bandwidth part activation, deactivation, and switching in wireless communications in accordance with aspects of the present disclosure. Wireless device 705 may be an example of aspects of a wireless device 605 or a UE 115 as described with reference to FIG. 6. Wireless device 705 may include receiver 710, UE communications manager 715, and transmitter 720. Wireless device 705 may also include a processor. Each of these components may be in communication with one another (e.g., via one or more buses).

Receiver 710 may monitor a control channel for a downlink transmission, and receive information such as packets, user data, or control information associated with various information channels (e.g., control channels, data channels, and information related to bandwidth part activation, deactivation, and switching in wireless communications, etc.). The received information may be passed on to other components of the device 705. Receiver 710 may transmit at least the received information to UE communications manager 715 via an electrical connection (e.g., a wire or a bus). The receiver 710 may be an example of aspects of the transceiver 935 described with reference to FIG. 9. The receiver 710 may utilize a single antenna or a set of antennas.

UE communications manager 715 may receive the information 740 transmitted from receiver 710, and may direct the information 740 to one or more components of UE communications manager 715. Based on the information 740, UE communications manager 715 may establish a connection with the base station 105 using a primary CC, the primary CC having the plurality of BWPs each having a portion of a frequency bandwidth of the primary CC, receive first DCI including an indication to activate a selected BWP of the plurality of BWPs, the first DCI excluding a grant of resources of the selected BWP for the UE 115, and activate the selected BWP based on the first DCI.

In some cases, UE communications manager 715 may deactivate the selected BWP based at least in part on an indication received in a second DCI or an expiration of a predetermined timer associated with the selected BWP. In some cases, UE communications manager 715 may receive a second DCI including an indication to switch from the selected BWP to a second selected BWP of the plurality of BWPs, the second DCI excluding a grant of resources of the second selected BWP for the UE. In some cases, UE communications manager 715 may cause transmitter 720 to transmit an acknowledgment to the base station 105 that indicates the second DCI was successfully received. In some cases, the first DCI may further include an indication to activate a secondary CC. In some cases, UE communications manager 715 may activate one or more BWPs of the secondary CC based at least in part on the indication to activate the secondary CC. In some cases, UE communications manager 715 may deactivate the secondary CC via a zero BWP.

UE communications manager 715 may be an example of aspects of the UE communications manager 915 described with reference to FIG. 9. UE communications manager 715 may also include connection establishment manager 725, DCI component 730, and BWP manager 735.

Connection establishment manager 725 may receive the information transmitted from receiver 710, and may establish a connection with a base station 105 using the primary CC, the primary CC having the plurality of BWPs each having a portion of a frequency bandwidth of the primary CC.

DCI component 730 may receive first DCI, the first DCI including an indication to activate a selected BWP of the set of BWPs, the first DCI excluding a grant of resources of the selected BWP for the UE 115. In some cases, the first DCI may further include an indication to activate a secondary CC. In some cases, DCI component 730 may receive, subsequent to the transmitting an indication of one or more measured channel characteristics, a second DCI including a grant of resources of the selected BWP. In some cases, DCI component 730 may receive a second DCI including a grant of resources of a secondary CC, and receive a third DCI that includes an indication to deactivate the secondary CC. In some cases, the indication to activate the selected BWP of the set of BWPs includes: an index value mapped to a table of combinations of active and inactive BWPs, or a bitmap indicating which of the set of BWPs are active and inactive. DCI component 730 may transmit the indication to activate the selected BWP or the indication to deactivate the secondary CC to BWP manager 735 via an electrical connection.

BWP manager 735 may receive the indication to activate the selected BWP or the indication to deactivate the secondary CC from DCI component 730 via an electrical connection. Based on the indication receive, BWP manager 735 may activate the selected BWP based on the first DCI and deactivate the selected BWP based on an indication received in a second DCI or an expiration of a predetermined timer associated with the selected BWP.

Transmitter 720 may receive signals generated by other components of the device 705 via one or more electrical connections, and transmit the received signals to other components of the device 705, or the base station 105. In some cases, transmitter 720 may transmit, within an uplink control channel, a transmission in accordance with power control for the selected BWP, wherein the selected BWP is an uplink BWP. In some cases, transmitter 720 may receive an indication of one or more measured channel characteristics of the selected BWP 745 from UE communications manager 715 via an electrical connection. Transmitter may then transmit the indication of the one or more measured channel characteristics to the base station 105. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
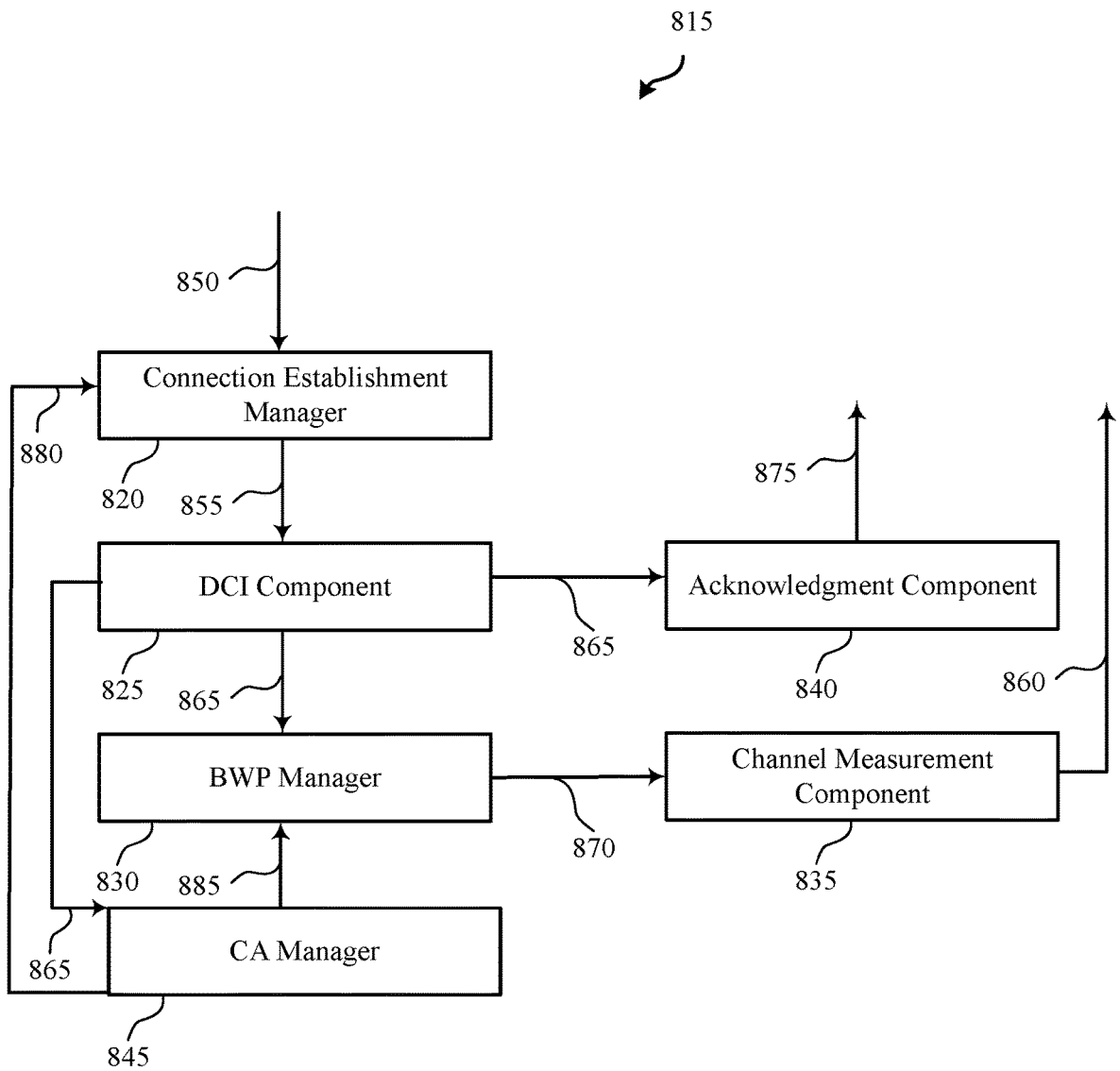

FIG. 8 shows a block diagram 800 of a UE communications manager 815 that supports bandwidth part activation, deactivation, and switching in wireless communications in accordance with aspects of the present disclosure. The UE communications manager 815 may be an example of aspects of a UE communications manager 615, a UE communications manager 715, or a UE communications manager 915 described with reference to FIGS. 6, 7, and 9. The UE communications manager 815 may include connection establishment manager 820, DCI component 825, BWP manager 830, channel measurement component 835, acknowledgment component 840, and carrier aggregation (CA) manager 845. Each of these modules may communicate, directly or indirectly, with one another (e.g., via one or more buses).

Connection establishment manager 820 may receive information 850 from a receiver (e.g., receiver 610, 710, or transceiver 935 in FIGS. 6, 7, and 9, respectively), and may direct the received information to one or more components of UE communications manager 815.

Connection establishment manager 820 may establish a connection with a base station 105 using a primary CC, the primary CC having a set of BWPs each having a portion of a frequency bandwidth of the primary CC. In some cases, connection establishment manager 820 may receive configuration information 880 via electrical connection to configure one or more secondary CCs from CA manager 845, and may establish a connection with the base station 105 using the configured one or more secondary CCs. In some cases, connection establishment manager 820 may cause a transmitter (e.g., transmitter 620, 720, or transceiver 935) to transmit, within an uplink control channel, a transmission in accordance with power control for the selected BWP, wherein the selected BWP is an uplink BWP. In some examples, connection establishment manager 820 may receive connection information 855, e.g., first DCI, second DCI via the established connection, and pass the connection information 855 to DCI component 825 via electrical connection.

DCI component 825 may receive the connection information 855, e.g., first DCI, wherein the first DCI includes an indication to activate a selected BWP of the set of BWPs, the first DCI excluding a grant of resources of the selected BWP for the UE 115. In some cases, DCI component 825 may receive from connection establishment manager 820, subsequent to the transmitting an indication 860 of one or more measured channel characteristics, a second DCI including a grant of resources of the selected BWP. In some cases, DCI component 825 may receive connection information 855 that includes a second DCI that provides a grant of resources of a secondary CC, and receive connection information 855 that includes a third DCI that provides an indication to deactivate the secondary CC. In some cases, the indication to activate the selected BWP of the set of BWPs includes: an index value mapped to a table of combinations of active and inactive BWPs, or a bitmap indicating which of the set of BWPs are active and inactive. DCI component 825 may transmit DCI information 865 including the first DCI, the second DCI, the third DCI, etc., to BWP manager 830 or acknowledgment component 840 via electrical connection.

BWP manager 830 may receive DCI information 865 from DCI component 825 and activate the selected BWP based on the first DCI and deactivate the selected BWP based on an indication received in a second DCI or an expiration of a predetermined timer associated with the selected BWP. In some cases, the first DCI may further include an indication to activate a secondary CC. In some cases, the second DCI may include an indication to switch from the selected BWP to a second selected BWP of the plurality of BWPs, the second DCI excluding a grant of resources of the second selected BWP for the UE. In some cases, BWP manager 830 may receive an indication 885 via electrical connection to activate one or more BWPs of a secondary CC from CA manager 845, and may activate the one or more BWPs of the secondary CC based on the indication 885. In some cases, BWP manager 830 may deactivate the secondary CC via a zero BWP.

In some cases, the activating the selected BWP may include measuring one or more channel characteristics associated with the selected BWP. BWP manager 830 may transmit an indication 870 to channel measurement component 835 via electrical connection to measure one or more channel characteristics. Channel measurement component 835 may measure one or more channel characteristic in accordance with the indication 870, and cause a transmitter (e.g., transmitter 620, 720, or transceiver 935) to transmit an indication 860 of the one or more measured channel characteristics to the base station 105.

Acknowledgment component 840 may receive DCI information 865 from DCI component 825, and transmit an acknowledgment 875 to the base station 105 that indicates the first DCI was successfully received. In some cases, DCI information 865 may include a second DCI received from the base station 105. In such cases, acknowledgment component 840 may transmit an acknowledgment 875 to the base station 105 that indicates the second DCI was success- fully received. In some cases, the transmitting the acknowledgment 875 to the base station 105 includes acknowledgment component 840 identifying uplink resources for transmitting the acknowledgment, and causing the transmitter (e.g., transmitter 620, 720, or transceiver 935) to transmit the acknowledgment using the identified uplink resources. In some cases, the uplink resources are indicated in the first DCI, selected from one or more preconfigured uplink resources, or any combination thereof.

CA manager 845 may receive DCI information 865 from DCI component 825, and configure one or more secondary CCs at the UE 115. In some cases, the DCI information 865 may be first DCI that includes an indication to activate a secondary CC. CA manager 845 may transmit the configuration information 880 of the one or more secondary CCs via electrical connection to connection establishment manager 820, which in turn causes the transmitter (e.g., transmitter 620, 720, or transceiver 935) to establish connection with the base station 105 using the one or more secondary CCs. In some cases, the indication to activate the secondary CC includes an indication to activate one or more BWPs of the secondary CC. CA manager 845 may transmit the indication 885 via electrical connection to activate the one or more BWPs of the secondary CC to BWP manager 830. In some cases, the first DCI, the second DCI, and the third DCI are each received during a discontinuous reception (DRX) ON duration, or while a DRX inactivity timer is running which started during the DRX ON duration, or any combination thereof.

Figure 9:
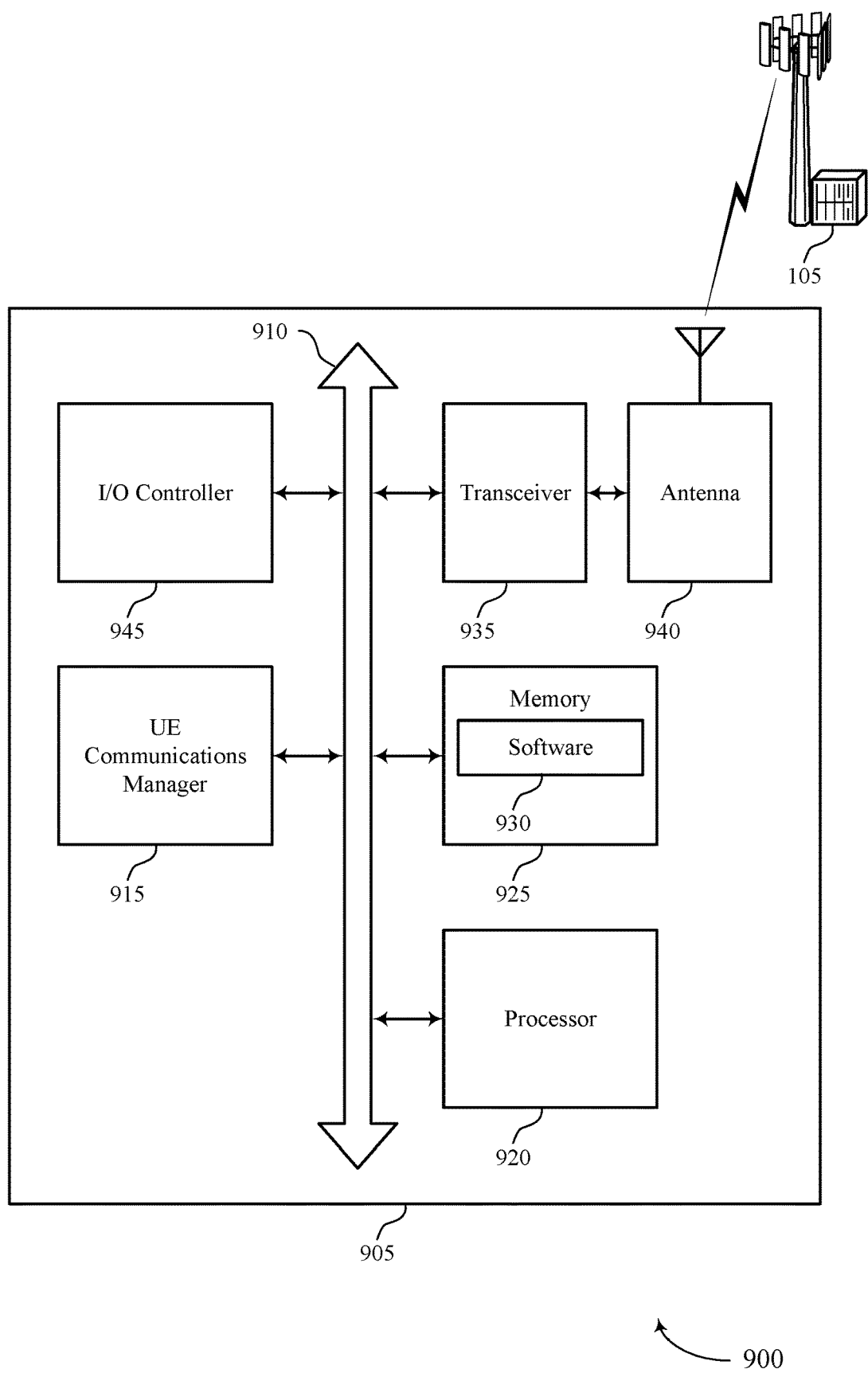
FIG. 9 illustrates a block diagram of a system including a UE that supports bandwidth part activation, deactivation, and switching in wireless communications in accordance with aspects of the present disclosure.

FIG. 9 shows a diagram of a system 900 including a device 905 that supports bandwidth part activation, deactivation, and switching in wireless communications in accordance with aspects of the present disclosure. Device 905 may be an example of or include the components of wireless device 605, wireless device 705, or a UE 115 as described above, e.g., with reference to FIGS. 6 and 7. Device 905 may include components for bi-directional voice and data communications including components for transmitting and receiving communications, including UE communications manager 915, processor 920, memory 925, software 930, transceiver 935, antenna 940, and I/O controller 945. These components may be in electronic communication via one or more buses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting bandwidth part activation, deactivation, and switching in wireless communications).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support bandwidth part activation, deactivation, and switching in wireless communications. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device 905 may include a single antenna 940. However, in some cases the device 905 may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
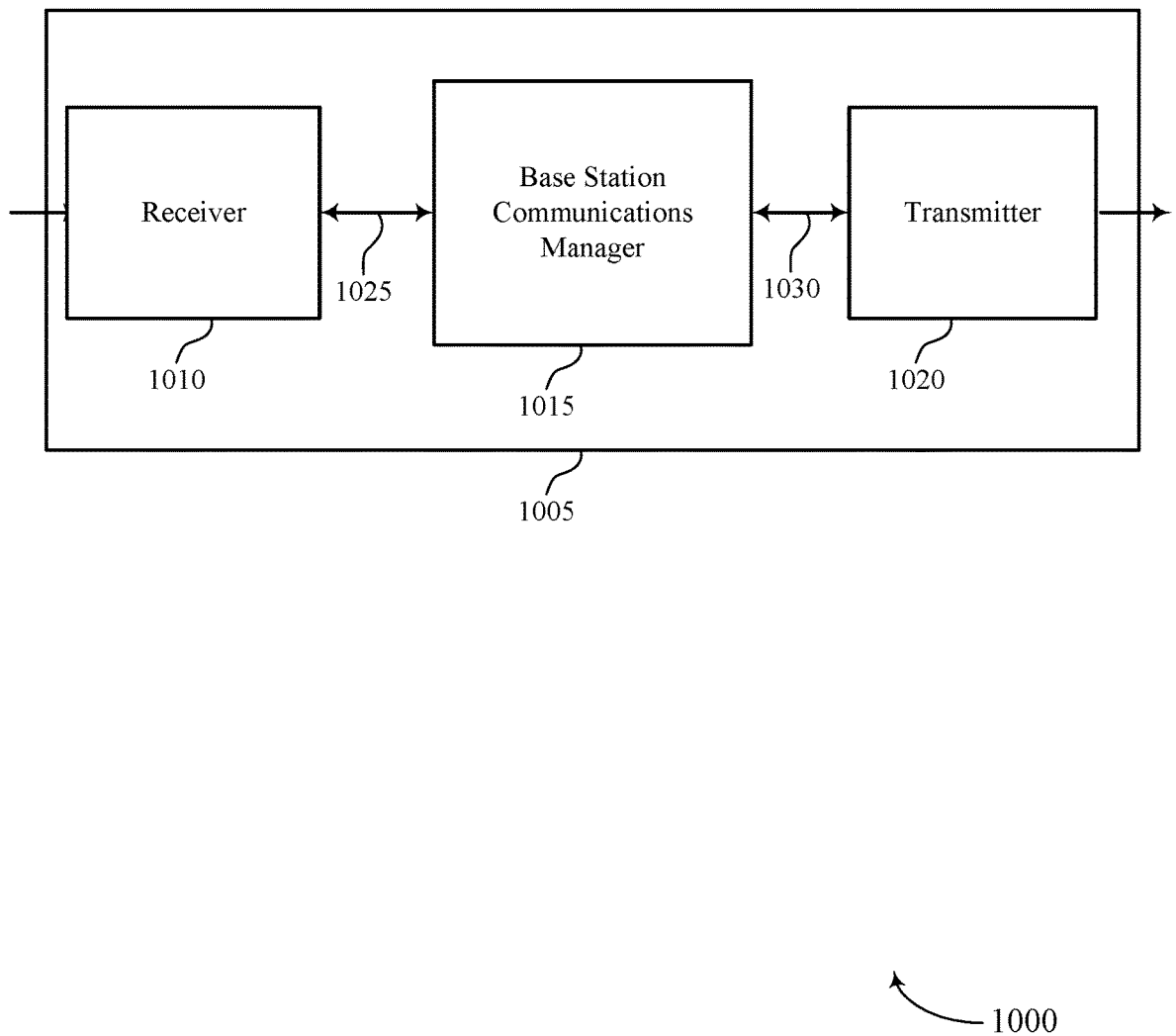
FIGS. 10 through 12 show block diagrams of a device that supports bandwidth part activation, deactivation, and switching in wireless communications in accordance with aspects of the present disclosure.

FIG. 10 shows a block diagram 1000 of a wireless device 1005 that supports bandwidth part activation, deactivation, and switching in wireless communications in accordance with aspects of the present disclosure. Wireless device 1005 may be an example of aspects of a base station 105 as described herein. Wireless device 1005 may include receiver 1010, base station communications manager 1015, and transmitter 1020. Wireless device 1005 may also include a processor. Each of these components may be in communication with one another (e.g., via one or more buses).

Receiver 1010 may monitor a control channel for an uplink transmission, and receive information such as packets, user data, or control information associated with various information channels (e.g., control channels, data channels, and information related to bandwidth part activation, deactivation, and switching in wireless communications, etc.). The received information 1025 may be passed on to other components of the device 1005. The receiver 1010 may be an example of aspects of the transceiver 1335 described with reference to FIG. 13. The receiver 1010 may utilize a single antenna or a set of antennas.

Base station communications manager 1015 may receive information 1025 transmitted from receiver 1010 via the electrical connection. Base station communications manager 1015 may establish a connection with a UE 115 using a primary CC, the primary CC having the plurality of BWPs each having a portion of a frequency bandwidth of the primary CC, formatting first DCI to include an indication to the UE 115 to activate a selected BWP of the plurality of BWPs, the first DCI excluding a grant of resources of the selected BWP for the UE 115, and transmit the first DCI to the UE 115.

In some cases, base station communications manager 1015 may transmit, subsequent to the transmitting the first DCI, a second DCI that includes an indication to the UE 115 to deactivate the selected BWP. In some cases, base station communications manager 1015 may transmit a second DCI including an indication to the UE 115 to switch from the selected BWP to a second selected BWP of the plurality of BWPs, the second DCI excluding a grant of resources of the second selected BWP for the UE 115. In some examples, the first DCI further includes an indication to activate a secondary CC.

Base station communications manager 1015 may be an example of aspects of the base station communications manager 1315 described with reference to FIG. 13.

Base station communications manager 1015 and/or at least some of its various sub-components may be implemented in hardware, software executed by a processor, firmware, or any combination thereof. If implemented in software executed by a processor, the functions of the base station communications manager 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 1015 and/or at least some of its various sub-components may be physically located at various positions, including being distributed such that portions of functions are implemented at different physical locations by one or more physical devices. In some examples, base station communications manager 1015 and/or at least some of its various sub-components may be a separate and distinct component in accordance with various aspects of the present disclosure. In other examples, base station communications manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

In some cases, base station communications manager 1015 may receive information 1025 from receiver 1010, and establish a connection with a UE 115 using the primary CC, the primary CC having the set of BWPs each having a portion of a frequency bandwidth of the primary CC, format first DCI to include an indication to the UE 115 to activate a selected BWP of the set of BWPs, the first DCI excluding a grant of resources of the selected BWP for the UE 115, and transmit DCI information 1030, e.g., the first DCI to transmitter 1020.

Transmitter 1020 may receive the DCI information 1030 from base station communications manager 1015, and transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may utilize a single antenna or a set of antennas.

Figure 11:
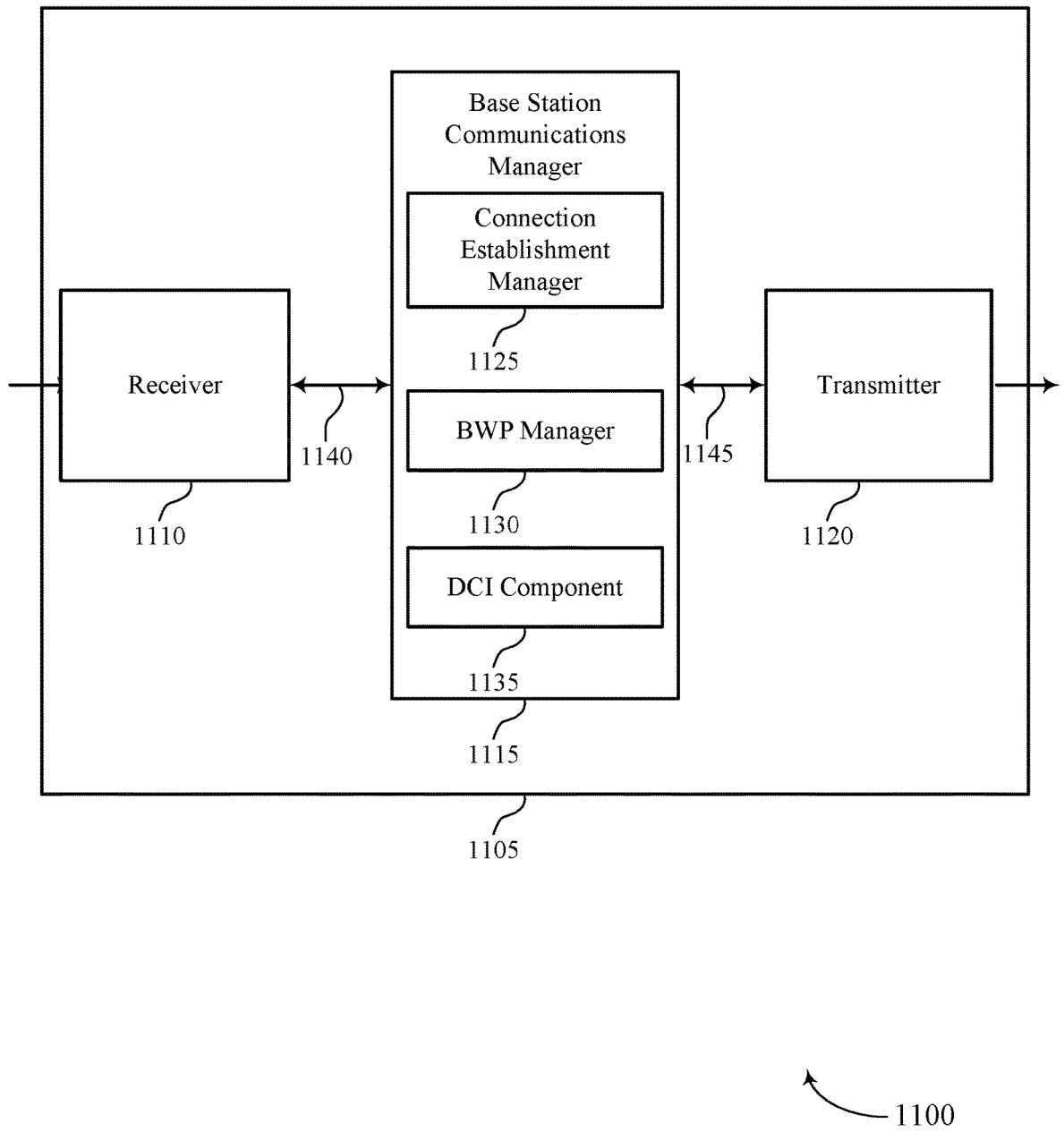

FIG. 11 shows a block diagram 1100 of a wireless device 1105 that supports bandwidth part activation, deactivation, and switching in wireless communications in accordance with aspects of the present disclosure. Wireless device 1105 may be an example of aspects of a wireless device 1005 or a base station 105 as described with reference to FIG. 10. Wireless device 1105 may include receiver 1110, base station communications manager 1115, and transmitter 1120. Wireless device 1105 may also include a processor. Each of these components may be in communication with one another (e.g., via one or more buses).

Receiver 1110 may monitor a control channel for an uplink transmission, and receive information such as packets, user data, or control information associated with various information channels (e.g., control channels, data channels, and information related to bandwidth part activation, deactivation, and switching in wireless communications, etc.). The received information 1140 may be passed on to other components of the device 1105. Receiver 1110 may transmit the received information 1140 to base station communications manager 1115 via an electrical connection. The receiver 1110 may be an example of aspects of the transceiver 1335 described with reference to FIG. 13. The receiver 1110 may utilize a single antenna or a set of antennas.

Base station communications manager 1115 may receive the information 1140 from receiver 1110 via the electrical connection, and may direct the received information to one or more components of base station communications manager 1115. Based on the information, base station communications manager may establish a connection with a UE 115 using a primary CC, the primary CC having the plurality of BWPs each having a portion of a frequency bandwidth of the primary CC, formatting first DCI to include an indication to the UE 115 to activate a selected BWP of the plurality of BWPs, the first DCI excluding a grant of resources of the selected BWP for the UE 115, and transmit DCI information 1145, e.g., the first DCI, to transmitter 1120. Transmitter 1120 may transmit DCI information 1145 to the UE 115, which in turn may activate the selected BWP and communicate with base station 105 using the selected BWP of the primary CC. In some cases, base station communications manager 1115 may transmit, subsequent to the transmitting the first DCI, a second DCI that includes an indication to the UE 115 to deactivate the selected BWP.

In some cases, base station communications manager 1115 may transmit a second DCI including an indication to the UE 115 to switch from the selected BWP to a second selected BWP of the plurality of BWPs, the second DCI excluding a grant of resources of the second selected BWP for the UE 115. In some examples, the first DCI further includes an indication to activate a secondary CC. Base station communications manager 1115 may be an example of aspects of the base station communications manager 1315 described with reference to FIG. 13. Base station communications manager 1115 may also include connection establishment manager 1125, BWP manager 1130, and DCI component 1135.

Connection establishment manager 1125 may receive the information 1140 from receiver 1110, and may establish, at a base station, a connection with a UE 115 using a primary CC, the primary CC having a set of BWPs each having a portion of a frequency bandwidth of the primary CC.

BWP manager 1130 may format first DCI to include an indication to the UE 115 to activate a selected BWP of the set of BWPs, the first DCI excluding a grant of resources of the selected BWP for the UE 115. In some cases, BWP manager 1130 may format the first DCI to include a BWP identifier (ID) indicating an ID of the selected BWP, and transmit DCI information 1145 including the formatted first DCI to transmitter 1120, which in turn transmits DCI information 1145 to the UE 115 to establish connection with the base station 105. In some cases, BWP manager 1130 may transmit a second DCI to DCI component 1135 that includes a grant of resources for the selected BWP, and may optionally transmit to DCI component 1135, subsequent to the transmitting the first DCI, a DCI that deactivates the selected BWP.

DCI component 1135 may receive the formatted DCI (e.g., the first DCI, the second DCI, etc.) from BWP manager 1130 via an electrical connection, and may transmit DCI information 1145, e.g., the first DCI, to transmitter 1120 and determine one or more transmission parameters for transmissions using the selected BWP based on the one or more channel characteristic measurements associated with the selected BWP. In some cases, the uplink resources are indicated in the first DCI, selected from one or more preconfigured uplink resources, or any combination thereof. In some cases, the indication to activate the selected BWP of the set of BWPs includes: an index value mapped to a combination of active and inactive BWPs, or a bitmap indicating which of the set of BWPs are active and inactive.

Transmitter 1120 may receive the DCI information 1145 from DCI component 1135 via an electrical connection, and may transmit signals generated by other components of the device 1105. In some examples, the transmitter 1120 may be collocated with a receiver 1110 in a transceiver module. For example, the transmitter 1120 may be an example of aspects of the transceiver 1335 described with reference to FIG. 13. The transmitter 1120 may utilize a single antenna or a set of antennas.

Figure 12:
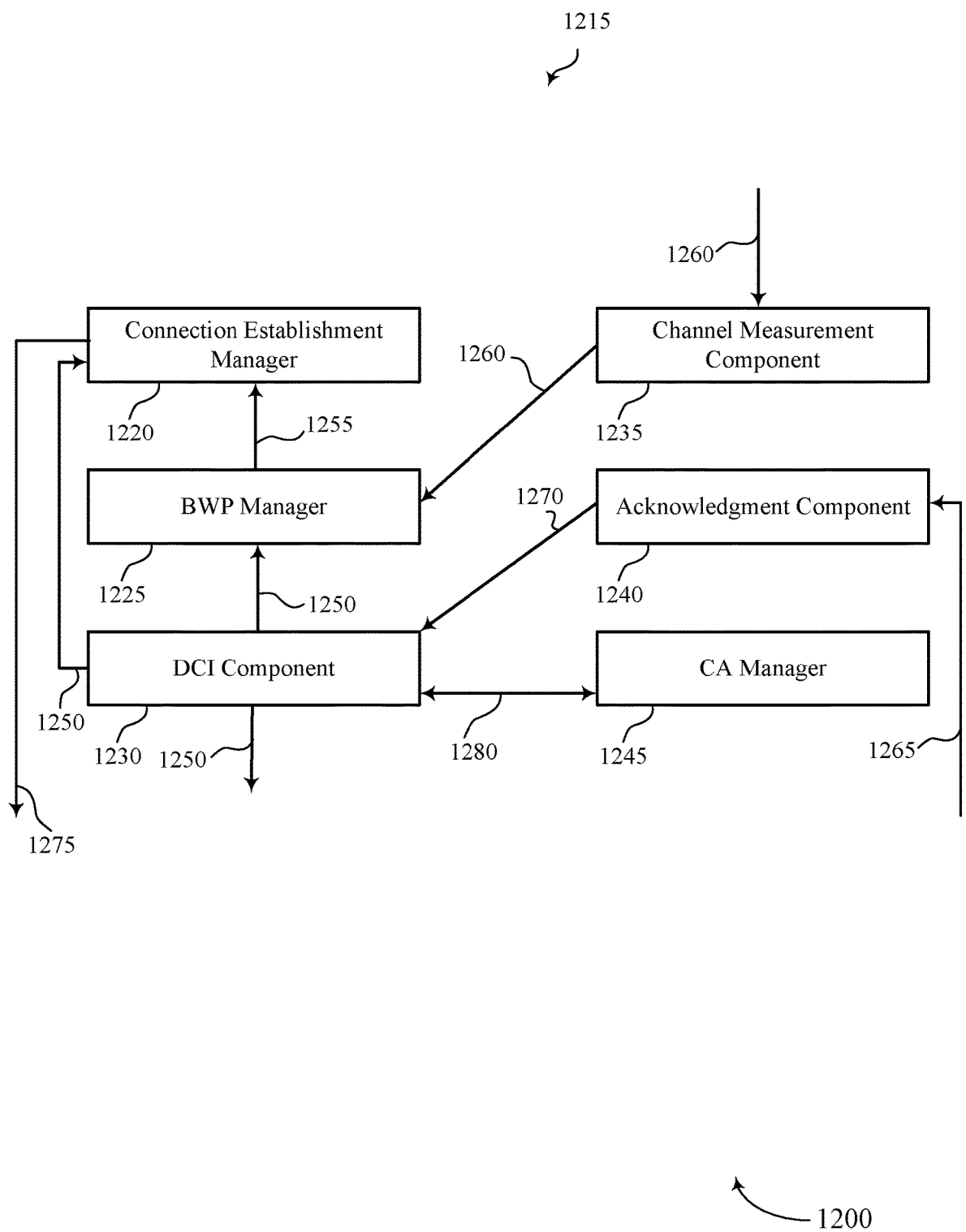

FIG. 12 shows a block diagram 1200 of a base station communications manager 1215 that supports bandwidth part activation, deactivation, and switching in wireless communications in accordance with aspects of the present disclosure. Base station communications manager 1215 may receive the information from receiver (e.g., receiver 1010 and 1110, transceiver 1335 as described with reference to FIGS. 10, 11, and 13) via the electrical connection, and may direct the received information to one or more components of base station communications manager 1215. Base station 105 may establish a connection with a UE 115 using a primary CC, the primary CC having the plurality of BWPs each having a portion of a frequency bandwidth of the primary CC, formatting first DCI to include an indication to the UE 115 to activate a selected BWP of the plurality of BWPs, the first DCI excluding a grant of resources of the selected BWP for the UE 115, and transmit DCI information 1250, e.g., the first DCI, to the UE 115 via transmitter (e.g., transmitter 1020 and 1120 or transceiver 1335 as described with reference to FIGS. 10, 11, and 13).

In some cases, base station communications manager 1215 may transmit, subsequent to the transmitting the first DCI, a second DCI that includes an indication to the UE 115 to deactivate the selected BWP. In some cases, base station communications manager 1215 may transmit a second DCI including an indication to the UE 115 to switch from the selected BWP to a second selected BWP of the plurality of BWPs, the second DCI excluding a grant of resources of the second selected BWP for the UE 115. In some examples, the first DCI further includes an indication to activate a secondary CC. The base station communications manager 1215 may be an example of aspects of a base station communications manager 1015, 1115, and 1315 described with reference to FIGS. 10, 11, and 13. The base station communications manager 1215 may include connection establishment manager 1220, BWP manager 1225, DCI component 1230, channel measurement component 1235, acknowledgment component 1240, and CA manager 1245. Each of these modules may communicate, directly or indirectly, with one another (e.g., via one or more buses).

Connection establishment manager 1220 may receive information from receiver (e.g., receiver 1010, 1110, or transceiver 1335), and may establish a connection with a UE 115 using a primary component carrier (CC), the primary CC having a plurality of bandwidth parts (BWPs) each having a portion of a frequency bandwidth of the primary CC. In some cases, connection establishment manager 1220 may receive DCI 1250 from DCI component 1230 via electrical connection configuring one or more secondary CCs for the UE 115, the DCI 1250 included in a DCI formatted by DCI component 1230 based on, e.g., one or more channel characteristic measurement of a selected BWP from the UE 115, a scheduled data traffic, etc. In some examples, the connection establishment manager 1220 may cause a transmitter (e.g., transmitter 1020, 1120, or transceiver 1335) to transmit control information 1275 that includes the DCI 1250 (e.g., first DCI, second DCI, etc.) for transmission to UE 115.

BWP manager 1225 may receive DCI 1250 (e.g., first DCI) from DCI component 1230 and format the first DCI to include an indication to the UE 115 to activate a selected BWP of the plurality of BWPs, the first DCI excluding a grant of resources of the selected BWP for the UE 115. In some cases, the indication to activate the selected BWP of the plurality of BWPs includes: an index value mapped to a combination of active and inactive BWPs, or a bitmap indicating which of the plurality of BWPs are active and inactive. In some cases, BWP manager 1130 may format the first DCI to include a BWP identifier (ID) indicating an ID of the selected BWP and switching state of the BWP ID (e.g., a BWP ID set at 1 means that BWP is to be activated), and transmit the formatted first DCI 1255 via electrical connection to connection establishment manager 1220 to cause a transmitter (e.g., transmitter 1020, 1120, or transceiver 1335) to transmit the formatted DCI 1255 as control information 1275 to the UE 115. In some cases, BWP manager 1225 may format a second DCI that includes a grant of resources for the selected BWP, and may optionally format, subsequent to the transmitting the first DCI, a DCI that deactivates the selected BWP (e.g., by the BWP ID of the selected BWP set at 0).

BWP manager 1225 may determine one or more transmission parameters for transmissions using the selected BWP based on the one or more channel characteristic measurements associated with the selected BWP. BWP manager 1225 may format a second DCI based on the determined one or more transmission parameters and transmit the formatted second DCI 1255 to connection establishment manager 1220 for establishing connection with the UE 115 based on the indication. In some cases, the formatted second DCI may include an indication to activate a secondary CC.

Channel measurement component 1235 may receive, from the UE 115 via the receiver (e.g., receiver 1010, 1110, or transceiver 1335), one or more channel characteristic measurements associated 1260 with the selected BWP, and may transmit the received one or more channel characteristic measurements 1260 to BWP manager 1225.

Acknowledgment component 1240 may configure uplink resources for transmission of an acknowledgment by the UE 115 that indicates the first DCI was successfully received and receive, from the receiver (e.g., receiver 1010, 1110, or transceiver 1335), the acknowledgment 1265 from the UE 115 via the configured uplink resources. In some cases, acknowledgment component 1240 may transmit the configured uplink resources 1270 to DCI component 1230, which may include in a DCI (e.g., a first DCI) an indication of the configured uplink resources. In some cases, the uplink resources are indicated in the first DCI, selected from one or more preconfigured uplink resources, or any combination thereof.

CA manager 1245 may determine a resource grant 1280 for a secondary CC, and transmit the resource grant 1280 to DCI component 1230 to include in a second DCI. The resource grant may also include an indication to activate one or more BWPs of the secondary CC. In some examples, when the secondary CC is to be deactivated, DCI component 1230 may transmit DCI information 1250 including a third DCI that includes an indication to deactivate the secondary CC.

DCI component 1230 may receive and transmit DCI information 1250, e.g., the first DCI, the second DCI, the third DCI, etc., to connection establishment manager 1220 for establishing connection with the UE 115 using DCI information 1250 and/or to BWP manager 1225 for formatting of the DCI.

Figure 13:
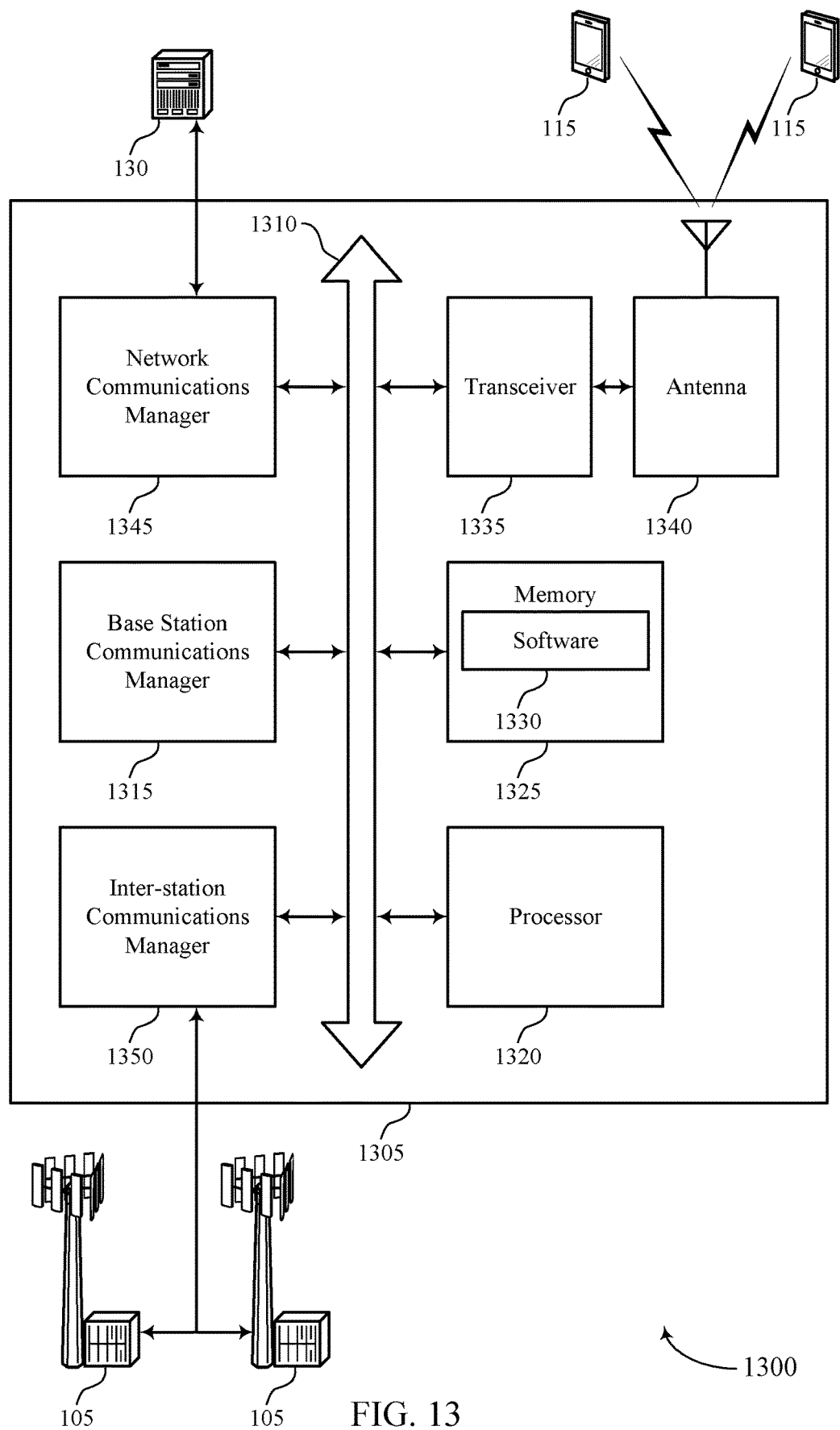
FIG. 13 illustrates a block diagram of a system including a base station that supports bandwidth part activation, deactivation, and switching in wireless communications in accordance with aspects of the present disclosure.

FIG. 13 shows a diagram of a system 1300 including a device 1305 that supports bandwidth part activation, deactivation, and switching in wireless communications in accordance with aspects of the present disclosure. Device 1305 may be an example of or include the components of base station 105 as described above, e.g., with reference to FIG. 1. Device 1305 may include components for bi-directional voice and data communications including components for transmitting and receiving communications, including base station communications manager 1315, processor 1320, memory 1325, software 1330, transceiver 1335, antenna 1340, network communications manager 1345, and inter-station communications manager 1350. These components may be in electronic communication via one or more buses (e.g., bus 1310). Device 1305 may communicate wirelessly with one or more UEs 115.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting bandwidth part activation, deactivation, and switching in wireless communications).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware or software operation such as the interaction with peripheral components or devices.

Software 1330 may include code to implement aspects of the present disclosure, including code to support bandwidth part activation, deactivation, and switching in wireless communications. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device 1305 may include a single antenna 1340. However, in some cases the device 1305 may have more than one antenna 1340, which may be capable of concurrently transmitting or receiving multiple wireless transmissions.

Network communications manager 1345 may manage communications with the core network (e.g., via one or more wired backhaul links). For example, the network communications manager 1345 may manage the transfer of data communications for client devices, such as one or more UEs 115.

Inter-station communications manager 1350 may manage communications with other base station 105, and may include a controller or scheduler for controlling communications with UEs 115 in cooperation with other base stations 105. For example, the inter-station communications manager 1350 may coordinate scheduling for transmissions to UEs 115 for various interference mitigation techniques such as beamforming or joint transmission. In some examples, inter-station communications manager 1350 may provide an X2 interface within an Long Term Evolution (LTE)/LTE-A wireless communication network technology to provide communication between base stations 105.

Figure 14:
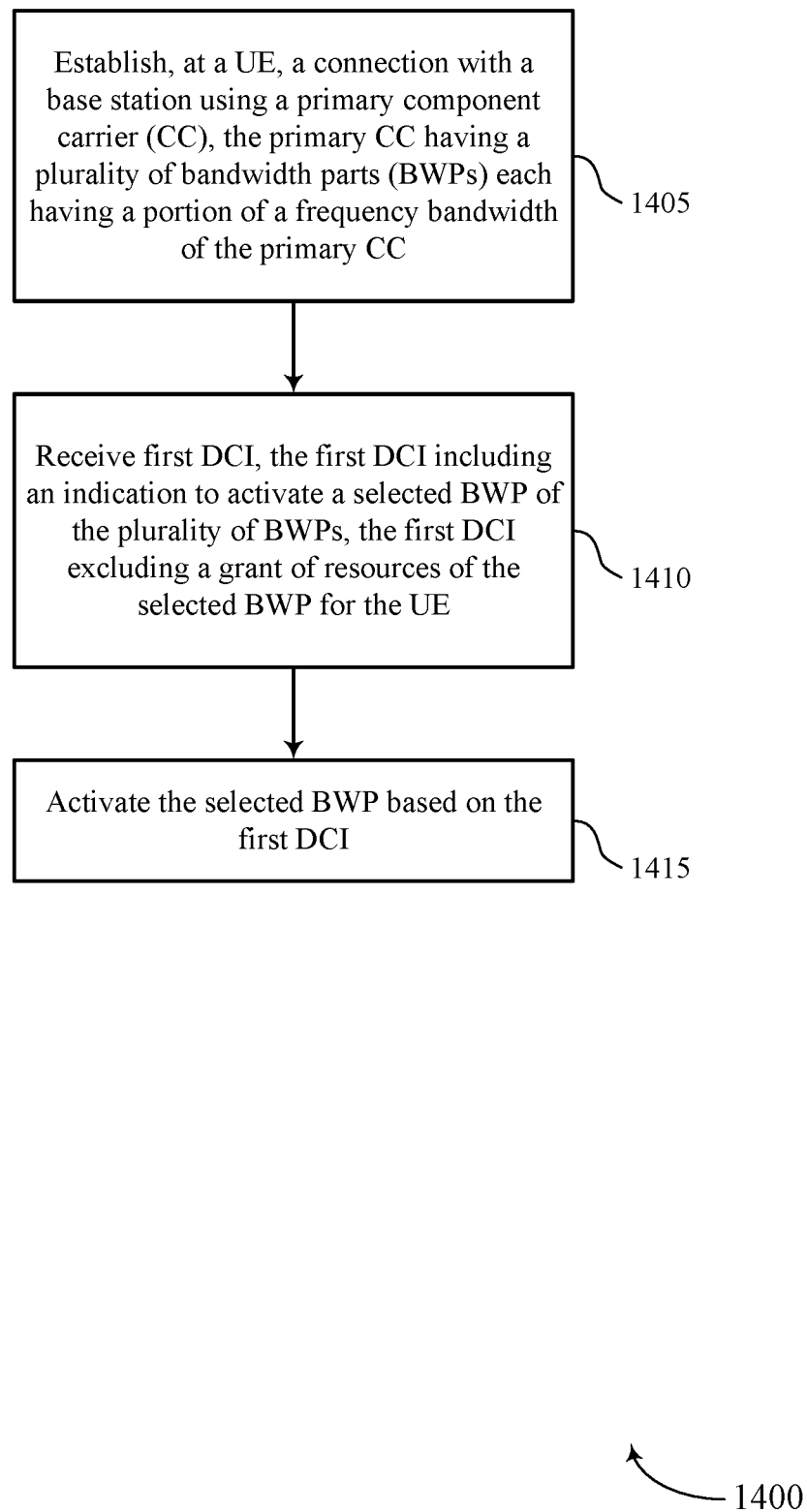
FIGS. 14 through 19 illustrate methods for bandwidth part activation, deactivation, and switching in wireless communications in accordance with aspects of the present disclosure.

FIG. 14 shows a flowchart illustrating a method 1400 for bandwidth part activation, deactivation, and switching in wireless communications in accordance with aspects of the present disclosure. The operations of method 1400 may be implemented by a UE 115 or its components as described herein. For example, the operations of method 1400 may be performed by a UE communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1405, the UE 115 may establish a connection with a base station 105 using a primary component carrier (CC), the primary CC having a plurality of bandwidth parts (BWPs) each having a portion of a frequency bandwidth of the primary CC. The operations of 1405 may be performed according to the methods described herein. The UE 115 may monitor a control channel for downlink transmissions and receive connection information (e.g., type of component carrier to use to communicate with the base station 105, type of uplink or downlink BWPs to activate for communication, control information including an identifier of a selected BWP, etc.) via receiver (e.g., 610, 710, or 935 as described herein with reference to FIGS. 6, 7, and 9), and may pass the received information to various components of the UE 115. The components of the UE 115 may receive the information and perform various functions described herein, e.g., activate the selected BWP, exchange information via transmitter (e.g., 620, 720, or 935 as described herein with reference to FIGS. 6, 7, and 9) and receiver. In certain examples, aspects of the operations of 1405 may be performed by a connection establishment manager as described with reference to FIGS. 6 through 9. In some cases, the connection establishment may include a configuration of one or more BWPs, one or more CCs, or any combination thereof.

At 1410, the UE 115 may receive first downlink control information (DCI), the first DCI including an indication to activate a selected BWP of the plurality of BWPs, the first DCI excluding a grant of resources of the selected BWP for the UE 115. The operations of 1410 may be performed according to the methods described herein. The UE 115 may receive from receiver (e.g., receiver 610, 710, or transceiver 935) the connection information including the first DCI. In certain examples, aspects of the operations of 1410 may be performed by a DCI component as described with reference to FIGS. 6 through 9. DCI component may receive the first DCI from receiver and decode the first DCI. In some cases, the DCI may include an index into a table that identified different combinations of BWPs that are to be activated or deactivated. In some cases, the DCI may include a bitmap that indicates whether each configured BWP is to be activated or deactivated. DCI component may transmit the decoded first DCI to BWP manager for activating the selected BWP of the plurality of BWPs.

At 1415, the UE 115 may activate the selected BWP based at least in part on the first DCI. The operations of 1415 may be performed according to the methods described herein. In certain examples, aspects of the operations of 1415 may be performed by a BWP manager as described with reference to FIGS. 6 through 9. BWP manager may receive the first DCI from, e.g., DCI component, and activate the selected BWP based on the first DCI. The UE 115 may use the activated BWP for communicating with the base station 105 via transmitter and receiver. In some cases, activation of the selected BWP may include performing measurements of channel characteristics of the selected BWP and providing the measurement information to the base station 105.

Figure 15:
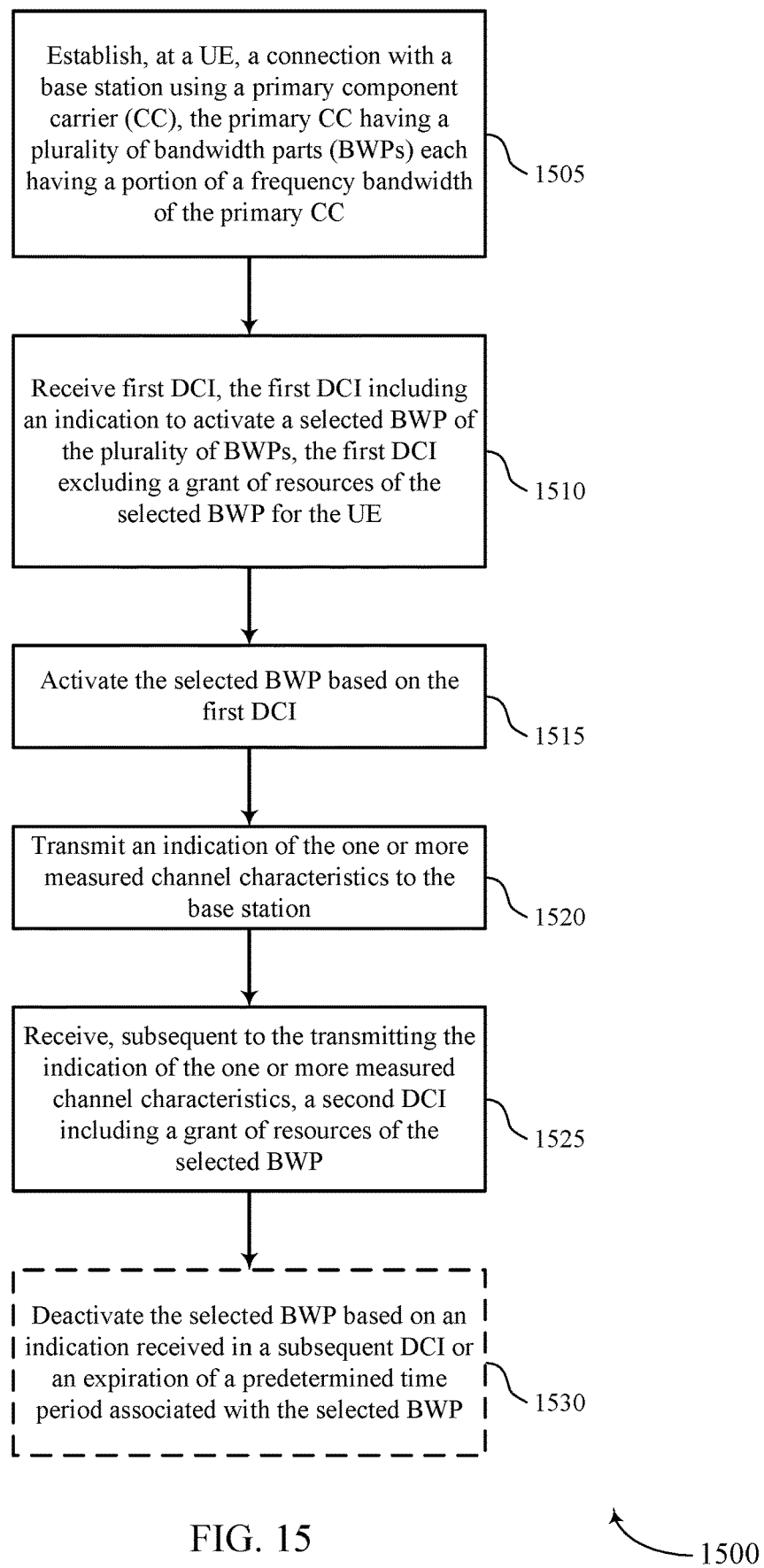

FIG. 15 shows a flowchart illustrating a method 1500 for bandwidth part activation, deactivation, and switching in wireless communications in accordance with aspects of the present disclosure. The operations of method 1500 may be implemented by a UE 115 or its components as described herein. For example, the operations of method 1500 may be performed by a UE communications manager 615, 715, 815, and 915 as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1505, the UE 115 may establish a connection with a base station 105 using a primary component carrier (CC), the primary CC having a plurality of bandwidth parts (BWPs) each having a portion of a frequency bandwidth of the primary CC. The operations of 1505 may be performed according to the methods described herein. The UE 115 may monitor a control channel for downlink transmissions and receive connection information (e.g., type of component carrier to use to communicate with the base station 105, type of uplink or downlink BWPs to activate for communication, control information including an identifier of a selected BWP, etc.) via receiver (e.g., 610, 710, or 935 as described herein with reference to FIGS. 6, 7, and 9), and may pass the received information to various components of the UE 115. The components of the UE 115 may receive the information and perform various functions described herein, e.g., activate the selected BWP, exchange information via transmitter (e.g., 620, 720, or 935 as described herein with reference to FIGS. 6, 7, and 9) and receiver. In certain examples, aspects of the operations of 1505 may be performed by a connection establishment manager as described with reference to FIGS. 6 through 9.

At 1510, the UE 115 may receive first downlink control information (DCI), the first DCI including an indication to activate a selected BWP of the plurality of BWPs, the first DCI excluding a grant of resources of the selected BWP for the UE 115. The operations of 1510 may be performed according to the methods described herein. The UE 115 may receive the first DCI from receiver (e.g., receiver 610, 710, or transceiver 935) and perform various functions as described herein. In certain examples, aspects of the operations of 1510 may be performed by a DCI component as described with reference to FIGS. 6 through 9. DCI component may receive and decode the first DCI, and transmit decoded first DCI to BWP manager for activating the selected BWP.

At 1515, the UE 115 may activate the selected BWP based at least in part on the first DCI. The operations of 1515 may be performed according to the methods described herein. In certain examples, aspects of the operations of 1515 may be performed by a BWP manager as described with reference to FIGS. 6 through 9. BWP manager may receive the first DCI, e.g., the decoded first DCI from DCI component, and activate the selected BWP based on the first DCI. The UE 115 may communicate with the base station 105 using the activated BWPs.

At 1520, the UE 115 may transmit an indication of the one or more measured channel characteristics to the base station 105. The operations of 1520 may be performed according to the methods described herein. In certain examples, aspects of the operations of 1520 may be performed by a channel measurement component as described with reference to FIGS. 6 through 9. In some examples, the activating the selected BWP may include measuring one or more channel characteristics associated with the selected BWP. The UE 115 may measure one or more channel characteristics associated with the selected BWP and may transmit the measured one or more channel characteristics to the base station 105 via, e.g., channel measurement component 835 as described herein with reference to FIG. 8.

At 1525, the UE 115 may receive, subsequent to the transmitting the indication of the one or more measured channel characteristics, a second DCI including a grant of resources of the selected BWP. The operations of 1525 may be performed according to the methods described herein. In certain examples, aspects of the operations of 1525 may be performed by a DCI component as described with reference to FIGS. 6 through 9. DCI component may receive and decode the second DCI, and may transmit the decoded second DCI to, e.g., BWP manager as described herein with reference to FIGS. 7 and 8 for determining the resources within the selected BWP for the UE 115 to use.

At 1530, the UE 115 optionally may deactivate the selected BWP based at least in part on an indication received in a second DCI or an expiration of a predetermined timer associated with the selected BWP. The operations of 1530 may be performed according to the methods described herein. In certain examples, aspects of the operations of 1530 may be performed by a BWP manager as described with reference to FIGS. 6 through 9. BWP manager may deactivate the selected BWP based on the indication received in the second DCI, and, if the second DCI includes an indication to activate one or more BWPs of a secondary CC, BWP manager may activate the one or more BWPs of the secondary CC. The UE 115 may communicate with the base station 105 using the activated one or more BWPs of the secondary CC. In some cases, BWP manager may deactivate the secondary CC via a zero BWP.

Figure 16:
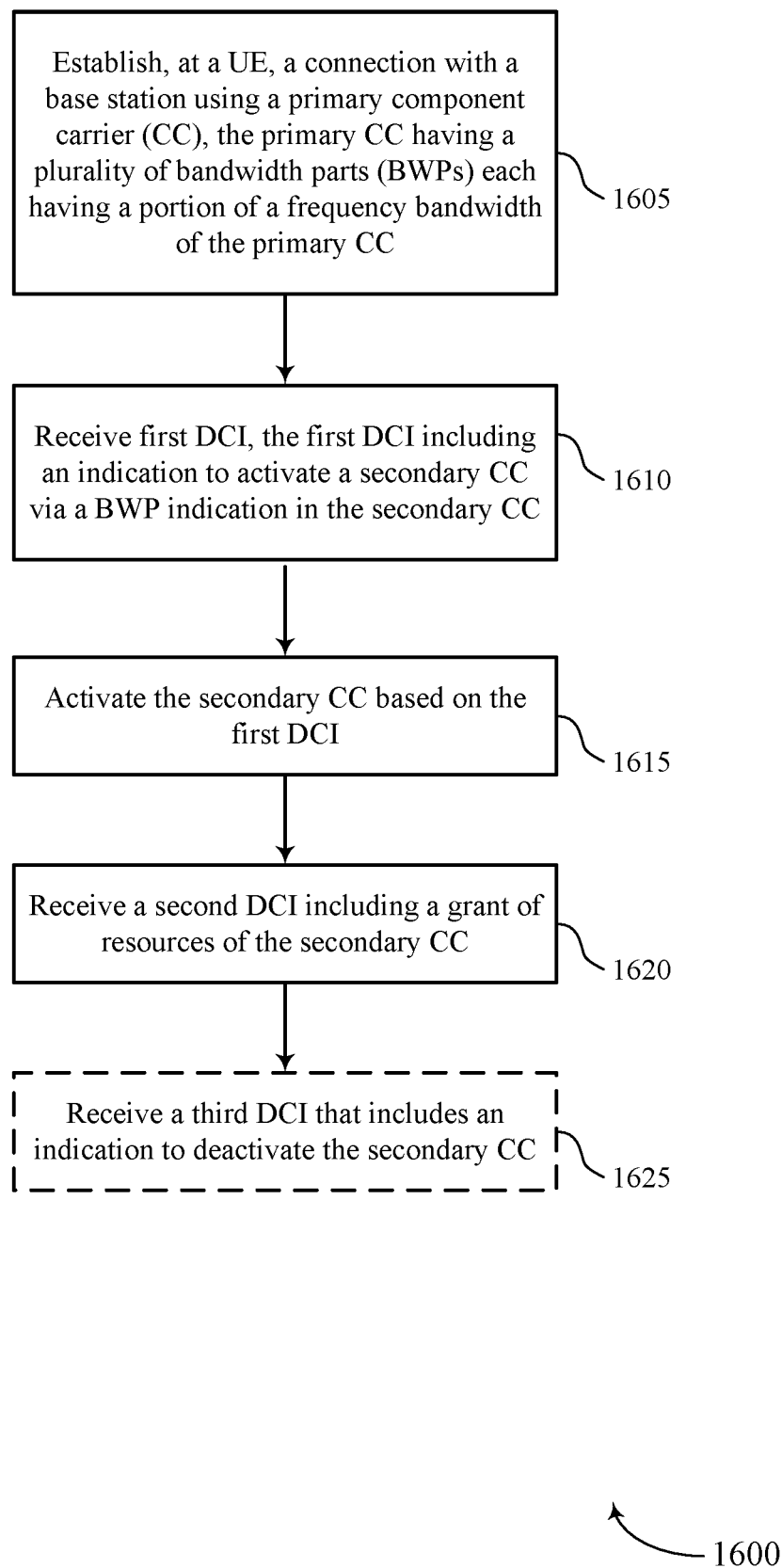

FIG. 16 shows a flowchart illustrating a method 1600 for bandwidth part activation, deactivation, and switching in wireless communications in accordance with aspects of the present disclosure. The operations of method 1600 may be implemented by a UE 115 or its components as described herein. For example, the operations of method 1600 may be performed by a UE communications manager 615, 715, 815, and 915 as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1605, the UE 115 may establish a connection with a base station 105 using a primary component carrier (CC), the primary CC having a plurality of bandwidth parts (BWPs) each having a portion of a frequency bandwidth of the primary CC. The operations of 1605 may be performed according to the methods described herein. The UE 115 may monitor a control channel for downlink transmissions and receive connection information (e.g., type of component carrier to use to communicate with the base station 105, type of uplink or downlink BWPs to activate for communication, control information including an identifier of a selected BWP, etc.) via receiver (e.g., 610, 710, or 935 as described herein with reference to FIGS. 6, 7, and 9), and may pass the received information to components of the UE 115. The components of the UE 115 may receive the information and perform various functions described herein, e.g., activate the selected BWP, exchange information via transmitter (e.g., 620, 720, or 935 as described herein with reference to FIGS. 6, 7, and 9) and receiver. In certain examples, aspects of the operations of 1605 may be performed by a connection establishment manager as described with reference to FIGS. 6 through 9.

At 1610, the UE 115 may receive first DCI, the first DCI including an indication to activate a secondary CC via a BWP indication in the secondary CC. The operations of 1610 may be performed according to the methods described herein. The UE 115 may receive from receiver (e.g., receiver 610, 710, or transceiver 935) the connection information including the first DCI. In certain examples, aspects of the operations of 1610 may be performed by a DCI component as described with reference to FIGS. 6 through 9. DCI component may receive the indication to activate the secondary CC from the base station 105 via receiver, and transmit the indication to another UE component, e.g., BWP manager 735 and 830 as described herein with reference to FIGS. 7 and 8.

At 1615, the UE 115 may activate the secondary CC based at least in part on the first DCI. The operations of 1615 may be performed according to the methods described herein. In certain examples, aspects of the operations of 1615 may be performed by a BWP manager as described with reference to FIGS. 6 through 9. BWP manager may receive the indication to activate the secondary CC from DCI component and may activate the secondary CC based on the received information.

At 1620, the UE 115 may receive a second DCI including a grant of resources of the secondary CC. The operations of 1620 may be performed according to the methods described herein. In certain examples, aspects of the operations of 1620 may be performed by a DCI component as described with reference to FIGS. 6 through 9. DCI component may receive the second DCI from the base station 105 via receiver, and may transmit DCI information, e.g., decoded second DCI, to BWP manager for determining the resources of the secondary CC, e.g., the resources within selected BWP of the secondary CC.

At 1625, the UE 115 optionally may receive a third DCI that includes an indication to deactivate the secondary CC. The operations of 1625 may be performed according to the methods described herein. In certain examples, aspects of the operations of 1625 may be performed by a DCI component as described with reference to FIGS. 6 through 9. DCI component may receive the third DCI from the base station 105 via receiver, and transmit DCI information, e.g., decoded third DCI, to CA manager for deactivating the secondary CC. Upon deactivation of the secondary CC, the UE 115 may communicate via a different CC or stop communicating with the base station 105.

Figure 17:
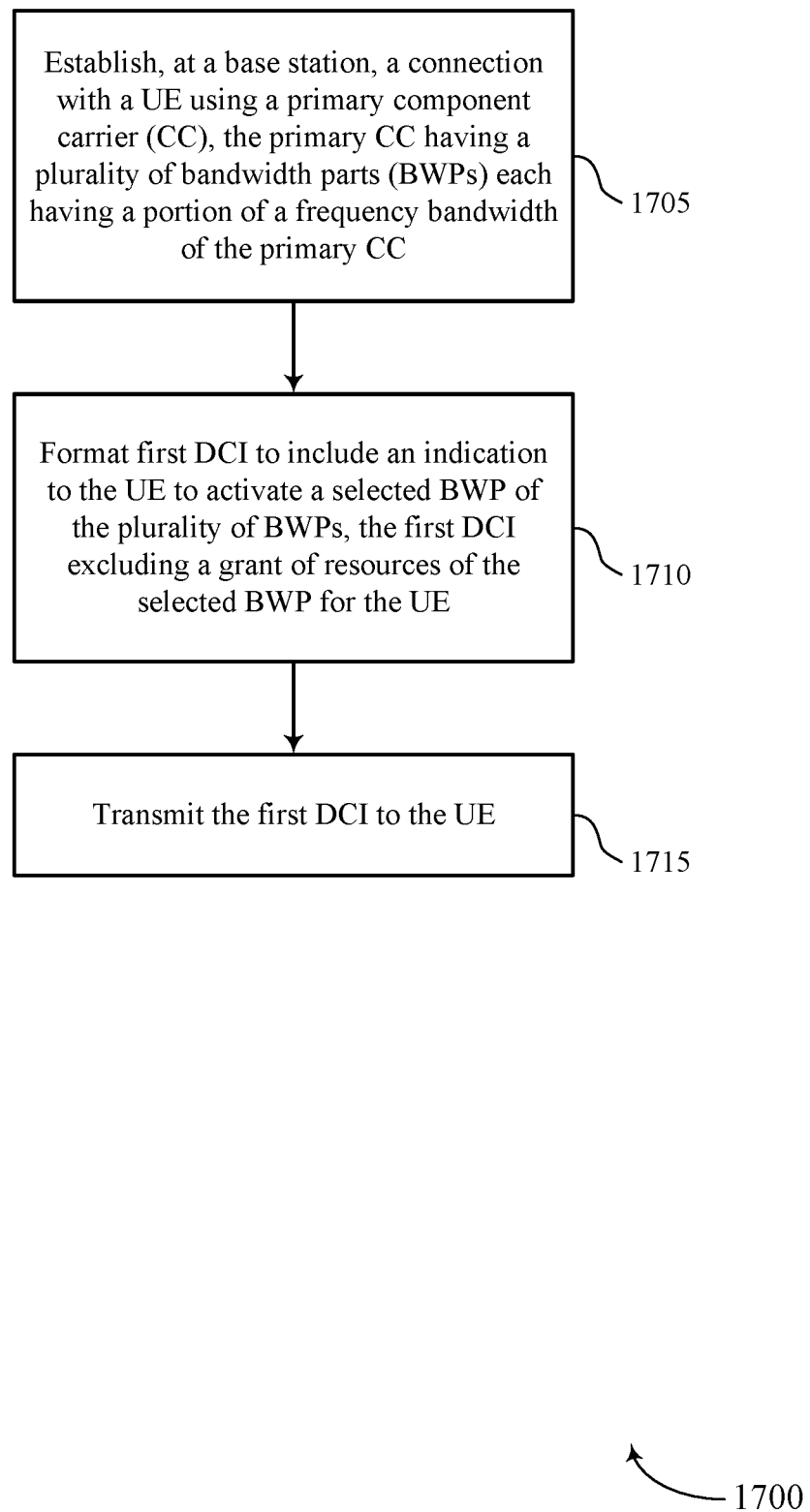

FIG. 17 shows a flowchart illustrating a method 1700 for bandwidth part activation, deactivation, and switching in wireless communications in accordance with aspects of the present disclosure. The operations of method 1700 may be implemented by a base station 105 or its components as described herein. The base station 105 may monitor a control channel for uplink transmissions and receive connection information (e.g., type of component carrier to use to communicate with the UE 115, one or more channel measurement characteristics, acknowledgment of control information from the UE 115, etc.) via receiver (e.g., 1010, 1110, or 1335 as described herein with reference to FIGS. 10, 11, and 13), and may pass the received information to various components of the base station 105. The components of the base station 105 may receive the information and perform various functions described herein, e.g., determine a CC for communications with the UE 115, select BWP for the communications, format control information including a BWP identifier, etc.), and communicate with the UE 115 via transmitter (e.g., 1020, 1120, or 1335 as described herein with reference to FIGS. 10, 11, and 13) and receiver. For example, the operations of method 1700 may be performed by a base station communications manager 1015, 1115, 1215, and 1315 as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At 1705, the base station 105 may establish a connection with a UE 115 using a primary component carrier (CC), the primary CC having a plurality of bandwidth parts (BWPs) each having a portion of a frequency bandwidth of the primary CC. The operations of 1705 may be performed according to the methods described herein. In certain examples, aspects of the operations of 1705 may be performed by a connection establishment manager as described with reference to FIGS. 10 through 13.

At 1710, the base station 105 may format first downlink control information (DCI) to include an indication to the UE 115 to activate a selected BWP of the plurality of BWPs, the first DCI excluding a grant of resources of the selected BWP for the UE. In some cases, the base station 105 may format the first DCI to include a BWP identifier (ID) indicating an ID of the selected BWP, and transmit DCI information 1145 including the formatted first DCI to the UE 115 to establish connection with the base station 105. The operations of 1710 may be performed according to the methods described herein. In certain examples, aspects of the operations of 1710 may be performed by a BWP manager as described with reference to FIGS. 10 through 13.

At 1715, the base station 105 may transmit the first DCI to the UE. The operations of 1715 may be performed according to the methods described herein. In certain examples, aspects of the operations of 1715 may be performed by a DCI component as described with reference to FIGS. 10 through 13.

Figure 18:
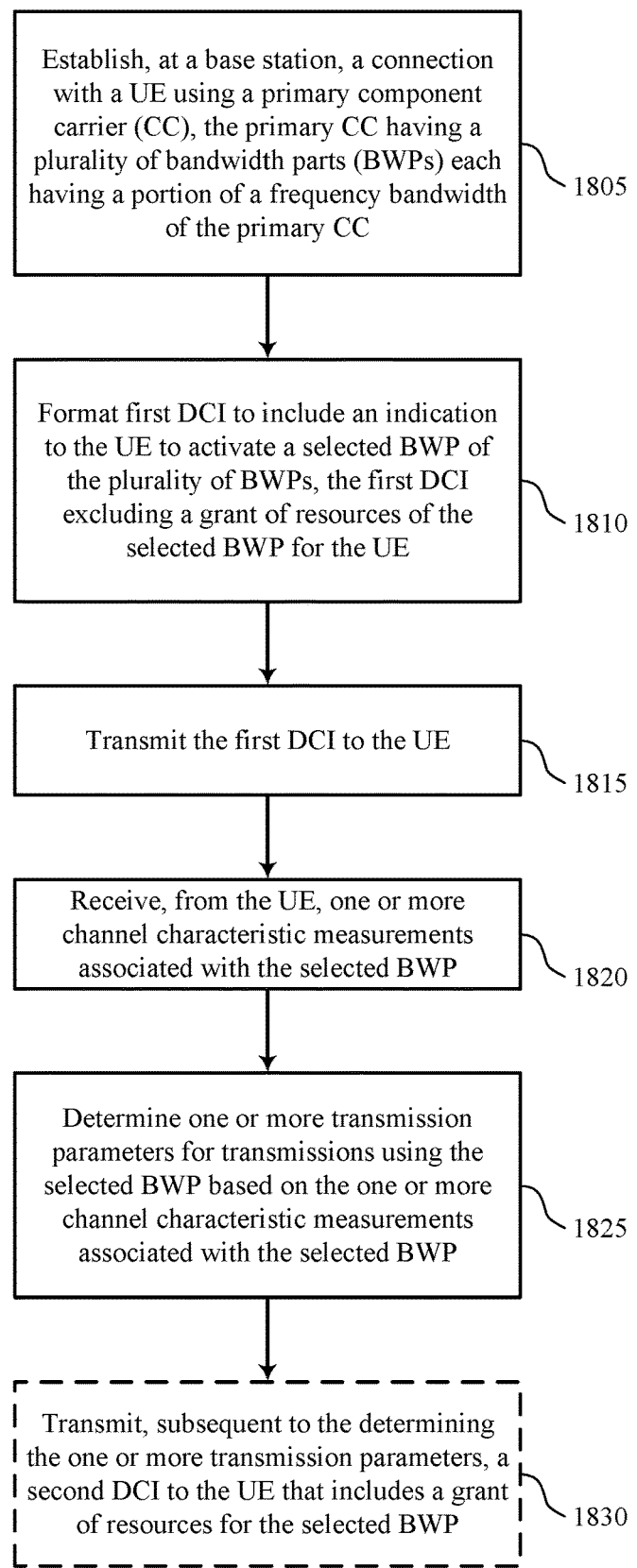

FIG. 18 shows a flowchart illustrating a method 1800 for bandwidth part activation, deactivation, and switching in wireless communications in accordance with aspects of the present disclosure. The operations of method 1800 may be implemented by a base station 105 or its components as described herein. For example, the operations of method 1800 may be performed by a base station communications manager 1015, 1115, 1215, and 1315 as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At 1805, the base station 105 may establish a connection with a user equipment (UE) using a primary component carrier (CC), the primary CC having a plurality of bandwidth parts (BWPs) each having a portion of a frequency bandwidth of the primary CC. The operations of 1805 may be performed according to the methods described herein. In certain examples, aspects of the operations of 1805 may be performed by a connection establishment manager as described with reference to FIGS. 10 through 13. Connection establishment manager may receive information (e.g., type of component carrier to use to communicate with the UE 115, one or more channel measurement characteristics, acknowledgment of control information from the UE 115, etc.) from receiver 1010, 1110, or 1310 as described herein with reference to FIGS. 10, 11, and 13) or other components of the base station 105. Connection establish manager may determine a CC for communications with the UE 115, select BWP for the communications, receive formatted control information including a BWP identifier, and communicate with the UE 115.

At 1810, the base station 105 may format first downlink control information (DCI) to include an indication to the UE 115 to activate a selected BWP of the plurality of BWPs, the first DCI excluding a grant of resources of the selected BWP for the UE 115. The operations of 1810 may be performed according to the methods described herein. In certain examples, aspects of the operations of 1810 may be performed by a BWP manager as described with reference to FIGS. 10 through 13. BWP manager may format the first DCI to include a BWP identifier (ID) indicating an ID of the selected BWP, and transmit DCI information including the formatted first DCI to DCI component to the UE 115

At 1815, the base station 105 may transmit the first DCI to the UE 115. The operations of 1815 may be performed according to the methods described herein. In certain examples, aspects of the operations of 1815 may be performed by a DCI component as described with reference to FIGS. 10 through 13. DCI component may receive DCI information including the formatted first DCI and transmit the DCI information to transmitter for transmitting the DCI information to the UE 115.

At 1820, the base station 105 may receive, from the UE 115, one or more channel characteristic measurements associated with the selected BWP. The operations of 1820 may be performed according to the methods described herein. In certain examples, aspects of the operations of 1820 may be performed by a channel measurement component as described with reference to FIGS. 10 through 13. The UE 115 may perform one or more channel characteristic measurements associated with the selected BWP and transmit the one or more channel measurement characteristics to the base station 105. Channel measurement component may receive from the UE 115 the one or more channel characteristics measurements associated with the selected BWP, and may transmit the received one or more channel measurement characteristics to DCI component as described with reference to FIGS. 10 through 13.

At 1825, the base station 105 may determine one or more transmission parameters for transmissions using the selected BWP based at least in part on the one or more channel characteristic measurements associated with the selected BWP. The operations of 1825 may be performed according to the methods described herein. In certain examples, aspects of the operations of 1825 may be performed by a DCI component as described with reference to FIGS. 10 through 13. DCI component may receive the one or more channel measurement characteristics from channel measurement component, and determine the one or more transmission parameters for communicating with the UE 115 using the selected BWP based on the one or more channel characteristic measurements.

At 1830, the base station 105 optionally may transmit, subsequent to the determining the one or more transmission parameters, a second DCI to the UE 115 that includes a grant of resources for the selected BWP. The operations of 1830 may be performed according to the methods described herein. In certain examples, aspects of the operations of 1830 may be performed by a BWP manager as described with reference to FIGS. 10 through 13. BWP manager may receive the determined one or more transmission parameters from DCI component, and may format the second DCI based on the determined one or more transmission parameters. BWP manager may then transmit the formatted second DCI to DCI component for transmitting the formatted second DCI to the UE 115 via transmitter.

Figure 19:
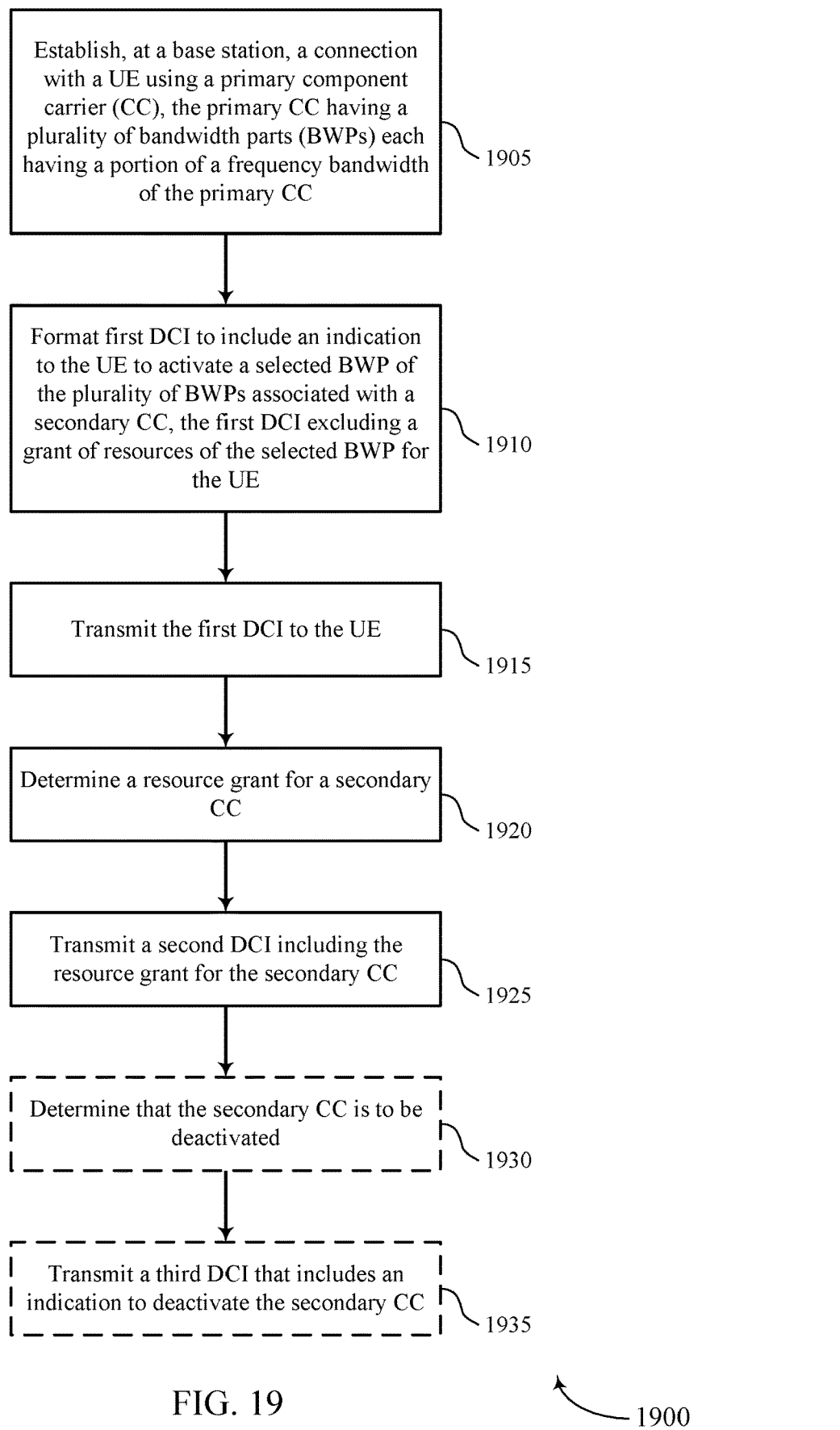

FIG. 19 shows a flowchart illustrating a method 1900 for bandwidth part activation, deactivation, and switching in wireless communications in accordance with aspects of the present disclosure. The operations of method 1900 may be implemented by a base station 105 or its components as described herein. For example, the operations of method 1900 may be performed by a base station communications manager 1015, 1115, 1215, and 1315 as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At 1905, the base station 105 may establish a connection with a user equipment (UE) 115 using a primary component carrier (CC), the primary CC having a plurality of bandwidth parts (BWPs) each having a portion of a frequency bandwidth of the primary CC. The operations of 1905 may be performed according to the methods described herein. In certain examples, aspects of the operations of 1905 may be performed by a connection establishment manager as described with reference to FIGS. 10 through 13. Connection establishment manager may receive information (e.g., type of component carrier to use to communicate with the UE 115, one or more channel measurement characteristics, acknowledgment of control information from the UE 115, etc.) from receiver 1010, 1110, or 1310 as described herein with reference to FIGS. 10, 11, and 13) or other components of the base station 105. Connection establish manager may determine a CC for communications with the UE 115, select BWP for the communications, receive formatted control information including a BWP identifier, and communicate with the UE 115.

At 1910, the base station 105 may format first downlink control information (DCI) to include an indication to the UE 115 to activate a selected BWP of the plurality of BWPs associated with a secondary CC, the first DCI excluding a grant of resources of the selected BWP for the UE 115. The operations of 1910 may be performed according to the methods described herein. In certain examples, aspects of the operations of 1910 may be performed by a BWP manager as described with reference to FIGS. 10 through 13. BWP manager may format the first DCI to include a BWP identifier (ID) indicating an ID of the selected BWP, and transmit DCI information including the formatted first DCI to DCI component to the UE 115.

At 1915, the base station 105 may transmit the first DCI to the UE 115. The operations of 1915 may be performed according to the methods described herein. In certain examples, aspects of the operations of 1915 may be performed by a DCI component as described with reference to FIGS. 10 through 13. DCI component may receive DCI information including the formatted first DCI and transmit the DCI information to the UE 115.

At 1920, the base station 105 may determine a resource grant for the secondary CC. The operations of 1920 may be performed according to the methods described herein. In certain examples, aspects of the operations of 1920 may be performed by a CA manager as described with reference to FIGS. 10 through 13. CA manager may receive DCI information, e.g., a second DCI including an indication to use a secondary CC for the UE 115, from DCI component. Based on the indication to use the secondary CC, CA manager may determine the resource grant for the secondary CC and transmit to DCI component the DCI information including the indication to use the secondary CC in accordance with the resource grant. DCI component may then transmit DCI information to connection establishment manager 1220 for establishing connection with the UE 115 using the secondary CC in accordance with the resource grant.

At 1925, the base station 105 may transmit a second DCI including the resource grant for the secondary CC. The operations of 1925 may be performed according to the methods described herein. In certain examples, aspects of the operations of 1925 may be performed by a CA manager as described with reference to FIGS. 10 through 13. Upon determining the resource grant for the secondary CC, CA manager transmit to DCI component the DCI information including the indication to use the secondary CC in accordance with the resource grant to DCI component, which in turn transmits DCI information to connection establishment manager for establishing connection with the UE 115 using the secondary CC in accordance with the resource grant.

At 1930, the base station 105 may determine that the secondary CC is to be deactivated. The operations of 1930 may be performed according to the methods described herein. In certain examples, aspects of the operations of 1930 may be performed by a CA manager as described with reference to FIGS. 10 through 13. When determining the resource grant for the secondary CC, CA manager may determine that no resources should be granted in the secondary CC for the UE 115 to use (e.g., due to scheduled traffic or channel conditions reported from the UE 115, etc.).

CA manager may then transmit the resource grant indicating that no resources are granted within that secondary CC to DCI component. Based on the resource grant, DCI component may transmit DCI information including the resource grant indication no resources allocated in the secondary CC to connection establishment manager. Connection establishment manager may then terminate connection with the UE 115 using the secondary CC.

At 1935, the base station 105 may transmit a third DCI that includes an indication to deactivate the secondary CC. The operations of 1935 may be performed according to the methods described herein. In certain examples, aspects of the operations of 1935 may be performed by a CA manager as described with reference to FIGS. 10 through 13. CA manager may transmit the resource grant allocating zero resources within the secondary CC to DCI component. DCI component may transmit DCI information including the resource grant to BWP manager, which in turn formats the third DCI including an indication that the secondary CC is to be deactivated. BWP manager transmits the formatted third DCI to DCI component for transmitting the third DCI to the UE 115 via transmitter.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. As used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   receiving, by a user equipment (UE), a first downlink control information (DCI) on a primary component carrier (CC), the first DCI including an indication to activate a first BWP of a secondary CC associated with the primary CC, the first DCI excluding a grant of resources of the first BWP for the UE;
   activating the first BWP based at least in part on the first DCI; and
   receiving a second DCI including an indication to switch from the first BWP to a second BWP, the second DCI excluding a grant of resources of the second BWP for the UE.

2. The method of claim 1, further comprising:
   deactivating the first BWP based at least in part on an indication received in the second DCI or an expiration of a predetermined timer associated with the first BWP.

3. The method of claim 1, further comprising:
   receiving a medium access control (MAC) control element (CE) indicating to activate a secondary CC; and
   activating the secondary CC based at least in part on the MAC CE.

4. The method of claim 1, further comprising:
   activating one or more BWPs of a secondary CC based at least in part on the first DCI including an indication to activate the secondary CC.

5. The method of claim 4, further comprising:
   deactivating the secondary CC via a zero BWP.

6. The method of claim 4, wherein the indication to activate the secondary CC comprises an indication to activate the one or more BWPs of the secondary CC.

7. The method of claim 6, further comprising:
   receiving a third DCI including a grant of resources of the secondary CC; and
   deactivating the secondary CC based at least in part on either:
      an indication received in a fourth DCI, or
      an expiration of a predetermined timer associated with the activated one or more BWPs of the secondary CC.

8. The method of claim 7, wherein activation and deactivation of the secondary CC occur during a DRX ON duration, or while a DRX inactivity timer is running which started during the DRX ON duration, or any combination thereof.

9. The method of claim 1, further comprising:
   transmitting an acknowledgment to a base station that indicates the second DCI was successfully received.

10. The method of claim 1, further comprising:
    transmitting, within an uplink control channel, a transmission in accordance with power control for the first BWP, wherein the first BWP is an uplink BWP.

11. The method of claim 1, wherein the activating the first BWP comprises:
    measuring one or more channel characteristics associated with the first BWP; and
    transmitting an indication of the one or more measured channel characteristics to a base station.

12. The method of claim 11, further comprising:
receiving, subsequent to the transmitting the indication of the one or more measured channel characteristics, a third DCI including a grant of resources of the first BWP.

13. The method of claim 1, further comprising:
transmitting an acknowledgment to a base station that indicates the first DCI was successfully received.

14. The method of claim 13, wherein the transmitting the acknowledgment to the base station comprises:
identifying uplink resources for transmitting the acknowledgment; and
transmitting the acknowledgment using the identified uplink resources.

15. The method of claim 14, wherein the identified uplink resources are indicated in the first DCI, from one or more preconfigured uplink resources, or any combination thereof.

16. The method of claim 1, wherein the indication to activate the first BWP comprises:
an index value mapped to a table of combinations of active and inactive BWPs.

17. A method for wireless communication, comprising:
formatting a first downlink control information (DCI) to include an indication to a user equipment (UE) to activate a first BWP of a secondary component carrier (CC) associated with a primary CC, the first DCI excluding a grant of resources of the first BWP for the UE;
transmitting the first DCI to the UE; and
transmitting a second DCI including an indication to the UE to switch from the first BWP to a second BWP, the second DCI excluding a grant of resources of the second BWP for the UE.

18. The method of claim 17, further comprising:
transmitting, subsequent to the transmitting the first DCI, a third DCI that includes an indication to the UE to deactivate the first BWP.

19. The method of claim 17, wherein the first DCI further includes an indication to activate the secondary CC.

20. The method of claim 19, wherein the indication to activate the secondary CC comprises an indication to activate one or more BWPs of the secondary CC.

21. The method of claim 20, further comprising:
determining a resource grant for the secondary CC;
transmitting a third DCI including the resource grant for the secondary CC;
determining that the secondary CC is to be deactivated; and
transmitting a fourth DCI that includes an indication to deactivate the secondary CC.

22. The method of claim 17, further comprising:
receiving, from the UE, one or more channel characteristic measurements associated with the first BWP; and
determining one or more transmission parameters for transmissions using the first BWP based at least in part on the one or more channel characteristic measurements associated with the first BWP.

23. The method of claim 22, further comprising:
transmitting, subsequent to the determining the one or more transmission parameters, a third DCI to the UE that includes a grant of resources for the first BWP.

24. The method of claim 17, further comprising:
configuring uplink resources for transmission of an acknowledgment by the UE that indicates the first DCI was successfully received; and
receiving the acknowledgment from the UE via the configured uplink resources.

25. The method of claim 24, wherein the identified uplink resources are indicated in the first DCI, from one or more preconfigured uplink resources, or any combination thereof.

26. The method of claim 17, wherein the indication to activate the first BWP comprises:
an index value mapped to a combination of active and inactive BWPs.

27. An apparatus for wireless communication at a user equipment (UE), comprising:
a processor;
memory in electronic communication with the processor; and
instructions stored in the memory and executable by the processor to cause the apparatus to:
receive first downlink control information (DCI) on a primary component carrier (CC), the first DCI including an indication to activate a first BWP of a secondary CC associated with the primary CC, the first DCI excluding a grant of resources of the first BWP for the UE;
activate the first BWP based at least in part on the first DCI; and
receive a second DCI including an indication to switch from the first BWP to a second BWP, the second DCI excluding a grant of resources of the second BWP for the UE.

28. An apparatus for wireless communication, comprising:
a processor;
memory in electronic communication with the processor; and
instructions stored in the memory and executable by the processor to cause the apparatus to:
format a first downlink control information (DCI) to include an indication to a user equipment (UE) to activate a first BWP of a secondary component carrier (CC) associated with a primary CC, the first DCI excluding a grant of resources of the first BWP for the UE;
transmit the first DCI to the UE; and
transmit a second DCI including an indication to the UE to switch from the first BWP to a second BWP, the second DCI excluding a grant of resources of the second BWP for the UE.

* * * * *